United States Patent
Baumann et al.

(10) Patent No.: US 9,511,461 B2
(45) Date of Patent: *Dec. 6, 2016

(54) INDEPENDENT AXIS ANCILLARY DEVICE

(71) Applicant: The Boeing Company, Chicago, IL (US)

(72) Inventors: John A. Baumann, St. Charles, MO (US); Herb Bommer, St. Peters, MO (US); Kurt A. Burton, Wildwood, MO (US); Mike P. Matlack, St. Charles, MO (US)

(73) Assignee: THE BOEING COMPANY, Chicago, IL (US)

( * ) Notice: Subject to any disclaimer, the term of this patent is extended or adjusted under 35 U.S.C. 154(b) by 618 days.

This patent is subject to a terminal disclaimer.

(21) Appl. No.: 13/902,931

(22) Filed: May 27, 2013

(65) Prior Publication Data

US 2013/0255884 A1    Oct. 3, 2013

Related U.S. Application Data

(60) Continuation-in-part of application No. 12/819,679, filed on Jun. 21, 2010, now Pat. No. 8,448,319, which is a division of application No. 11/771,188, filed on Jun. 29, 2007, now Pat. No. 7,774,910.

(60) Provisional application No. 60/849,689, filed on Oct. 5, 2006.

(51) Int. Cl.
| | |
|---|---|
| *B25B 27/14* | (2006.01) |
| *B23Q 3/16* | (2006.01) |
| *B23K 20/12* | (2006.01) |
| *B32B 38/18* | (2006.01) |
| *B23Q 3/00* | (2006.01) |

(52) U.S. Cl.
CPC .............. *B23Q 3/16* (2013.01); *B23K 20/126* (2013.01); *B23Q 3/002* (2013.01); *B32B 38/18* (2013.01); *Y10T 29/53961* (2015.01); *Y10T 156/17* (2015.01)

(58) Field of Classification Search
USPC .......................................... 29/270, 271, 272
See application file for complete search history.

(56) References Cited

U.S. PATENT DOCUMENTS

| | | | |
|---|---|---|---|
| 4,932,280 A | 6/1990 | Becker et al. | |
| 5,343,603 A | 9/1994 | Pioch | |
| 5,893,507 A * | 4/1999 | Ding | B23K 20/125 156/580 |
| 5,964,016 A | 10/1999 | Ito et al. | |
| 6,185,818 B1 | 2/2001 | Ito et al. | |

(Continued)

OTHER PUBLICATIONS

Office Action, dated May 19, 2009, regarding U.S. Appl. No. 11/771,188, 5 pages.

(Continued)

*Primary Examiner* — Joseph J Hail
*Assistant Examiner* — Shantese McDonald
(74) *Attorney, Agent, or Firm* — Yee & Associates, P.C.

(57) ABSTRACT

A manufacturing apparatus is presented. The manufacturing apparatus comprises a tool support movable along multiple axes; a tool mounted on the tool support for performing a manufacturing operation on a workpiece; and an ancillary device releasably mounted on the tool support and used in conjunction with the tool, the ancillary device moveable along at least a first axis independent of the movement of the tool.

18 Claims, 21 Drawing Sheets

(56) References Cited

U.S. PATENT DOCUMENTS

| | | |
|---|---|---|
| 6,199,745 B1 | 3/2001 | Campbell et al. |
| 6,254,075 B1 | 7/2001 | Kozima |
| 6,305,678 B1 | 10/2001 | Hammersmith et al. |
| 6,389,698 B1 | 5/2002 | Malatier |
| 6,539,600 B2 | 4/2003 | Wu et al. |
| 6,546,609 B1 | 4/2003 | Lee et al. |
| 6,634,072 B2 | 10/2003 | Ohmori et al. |
| 6,874,773 B1 | 4/2005 | Newbould |
| 7,076,851 B2 | 7/2006 | Rousset |
| 7,104,870 B2 | 9/2006 | Fong et al. |
| 7,168,694 B2 | 1/2007 | Bui et al. |
| 7,235,757 B2 | 6/2007 | Lohwasser |
| 7,290,760 B1 | 11/2007 | Lindsay |
| 7,404,512 B2 | 7/2008 | Baumann et al. |
| 7,552,856 B2 | 6/2009 | Nagano |
| 7,618,028 B2 | 11/2009 | Huisken et al. |
| 7,641,739 B2 | 1/2010 | Matlack et al. |
| 7,721,938 B2 | 5/2010 | Nagano |
| 7,748,591 B2 | 7/2010 | Wood et al. |
| 7,774,910 B2 | 8/2010 | Baumann et al. |
| 8,205,785 B2 | 6/2012 | Burton et al. |
| 2005/0092817 A1 | 5/2005 | Baumann et al. |
| 2006/0102689 A1* | 5/2006 | Trapp .................. B23K 20/126 228/2.1 |
| 2006/0191979 A1 | 8/2006 | Lohwasser |
| 2006/0237888 A1 | 10/2006 | Burton et al. |
| 2008/0084018 A1 | 4/2008 | Baumann et al. |
| 2008/0128473 A1* | 6/2008 | Zhou .................. B23K 20/126 228/2.3 |
| 2009/0108050 A1 | 4/2009 | Nagano |
| 2009/0223621 A1 | 9/2009 | Burton et al. |
| 2010/0252172 A1 | 10/2010 | Baumann et al. |

OTHER PUBLICATIONS

Final Office Action, dated Mar. 29, 2010, regarding U.S. Appl. No. 11/771,188, 8 pages.
Notice of Allowance, dated Jun. 1, 2010, regarding U.S. Appl. No. 11/771,188, 14 pages.
Office Action, dated Sep. 19, 2012, regarding U.S. Appl. No. 12/819,679, 10 pages.
Notice of Allowance, dated Jan. 16, 2013, regarding U.S. Appl. No. 12/819,679, 5 pages.

* cited by examiner

INDEPENDENT AXIS ANCILLARY DEVICE

CROSS REFERENCE TO RELATED APPLICATIONS

This application is a continuation-in-part application of patent application Ser. No. 12/819,679, filed Jun. 21, 2010, status allowed; which is a divisional of application Ser. No. 11/771,188, filed Jun. 29, 2007, now U.S. Pat. No. 7,774,910, issued Aug. 17, 2010; all of which claim the benefit of Provisional U.S. Patent Application No. 60/849,689 filed Oct. 5, 2006.

FIELD

This disclosure generally relates to manufacturing tools having integrated clamping fixtures, and deals more particularly with a tool having a workpiece clamp that can be moved along an axis independent of the direction of tool movement.

BACKGROUND

A variety of clamping devices are available for applying clamping force to a workpiece in an area near a manufacturing tool operating on the workpiece. The application of clamping forces near the manufacturing tool may reduce the need for complicated or cumbersome external clamping tools that may be needed in processes such as friction stir welding (FSW), to locate the parts being welded, prevent part separation during welding and react to process loads generated during the welding process.

One clamping device suitable for use with a FSW machine is disclosed in US Patent Application Publication Number 2005/0092817 published May 5, 2005, and assigned to The Boeing Company. In this prior patent application, the clamping device is mounted on a spindle head that carries the FSW tool. The clamping device is constrained to mechanically follow the path of the FSW tool spindle. The spindle head is mounted on a machine tool arm that moves along any of 3 orthogonal axes in which the weld path, and thus the movement of the clamping device, is straight. In some applications, however, complex curvatures of workpieces require more complicated movements of the FSW tool as well as the clamping device. In these more complicated workpiece geometries, the tool path may vary with the changing slope and contours of the workpiece. As a result, the clamping device may not always "track" with the FSW tool to apply clamping force when and where it is required.

Accordingly, there is a need for a workpiece clamping apparatus that is mounted on a common support with a tool, but yet can be moved independently of the tool so that clamping force can be applied at the desired workpiece locations regardless of the orientation of the tool or the support. It would also be desirable to provide a clamping apparatus and related method that coordinates the independent movement of the clamping device with movement of the tool. Embodiments of the disclosure are intended to satisfy these needs.

SUMMARY

Embodiments of the disclosure provide a clamping apparatus that may be mounted on a common support with a tool, such as a spindle housing, but which may be moved independently of the tool in order to closely follow the contour of a workpiece. The clamping apparatus may be mounted on a spindle housing for movement along at least one axis that is independent of the movement of the tool. The apparatus may include clamping rollers that roll along the surface of the workpiece in order to reduce friction, and apply programmable amounts of clamping force to the workpiece.

According to one disclosed embodiment, a manufacturing apparatus is provided, comprising: a spindle support moveable along multiple axes; a tool mounted on the spindle support for performing a manufacturing operation on the workpiece; and, a clamping assembly mounted on the spindle support for movement along at least one axis independent of the movement of the spindle. The clamping assembly includes clamping devices for applying clamping pressure to the workpiece. The clamping assembly may include a rotary drive mounted on the spindle support for rotating the clamping devices around the independent axis. The clamping devices may comprise clamping packs that include a clamping roller mounted on a pneumatically driven slide for applying a programmable amount of pressure to the workpiece. The rotary drive includes a stationary portion secured to the spindle support, and a rotating portion driven by a motorized gear drive.

According to another disclosed embodiment, apparatus is provided for performing operations on a workpiece, comprising: a tool assembly including a tool moveable along multiple axes; and a clamping assembly mounted on the tool assembly, the clamping assembly including at least one clamping device for applying clamping pressure to the workpiece, and means for mounting at least one clamping device for movement along at least a first axis independent of the movement of the tool. The tool assembly may include a spindle support and the mounting means may include a rotary mount for mounting at least one clamping device on the spindle support for rotation around the first axis. The mounting means may further include a slide assembly coupled with rotary mount for mounting the clamping device for movement along a second axis, toward and away from the workpiece. The rotary mount may include a stationary portion secured to the spindle, a rotatable portion, and a motorized drive for driving the second portion relative to the first portion. The motorized drive may include an electric motor and a gear drive coupling the motor with the rotatable portion of the rotary mount. The clamping device may include a roller clamp for engaging workpiece and means for biasing the roller clamp against the workpiece. The biasing means may comprise a fluid driven motor, such as a pneumatic cylinder. The clamping device may include a clamping pack and a releasable connection for releasably securing the clamping pack on the mounting means, thereby permitting the use of interchangeable clamping elements.

According to a method embodiment, manufacturing operations are performed on a workpiece, comprising the steps of: contacting the workpiece with a tool; moving the tool along any of multiple axes; moving a clamp along at least a first axis independent of the movement of the tool; and, clamping the workpiece using the clamp. Contacting the workpiece with the tool may comprise plunging a friction stir welding pin tool into the workpiece while the workpiece is being clamped. The tool may be moved by moving a spindle housing over the workpiece, and the clamp may be moved by rotating the clamp around the first axis as the spindle housing moves over the workpiece. The method may further comprise the step of coordinating the movement of the clamp with the movement of the tool.

According to yet another illustrative embodiment, a manufacturing apparatus is presented. The manufacturing apparatus comprises a tool support movable along multiple axes; a tool mounted on the tool support for performing a manufacturing operation on a workpiece; and an ancillary device releasably mounted on the tool support and used in conjunction with the tool, the ancillary device moveable along at least a first axis independent of the movement of the tool.

According to a further illustrative embodiment, a manufacturing apparatus is presented. The manufacturing apparatus comprises a tool support movable along multiple axes, the tool support comprising a number of flanges; a tool mounted on the tool support for performing a manufacturing operation on a workpiece; an ancillary device releasably mounted on at least one of the number of flanges of the tool support; and a clamping assembly releasably mounted on at least one of the number of flanges of the tool support for movement along the at least first axis independent of the movement of the tool. The ancillary device is used in conjunction with the tool, and moveable along at least a first axis independent of the movement of the tool. The clamping assembly comprises at least one clamping device for applying clamping pressure to the workpiece. The at least one clamping device comprises a roller clamp for engaging the workpiece and means for biasing the roller clamp against the workpiece.

Other features, benefits and advantages of the disclosed embodiments will become apparent from the following description of embodiments, when viewed in accordance with the attached drawings and appended claims.

BRIEF DESCRIPTION OF THE ILLUSTRATIONS

DETAILED DESCRIPTION

Figure 1:
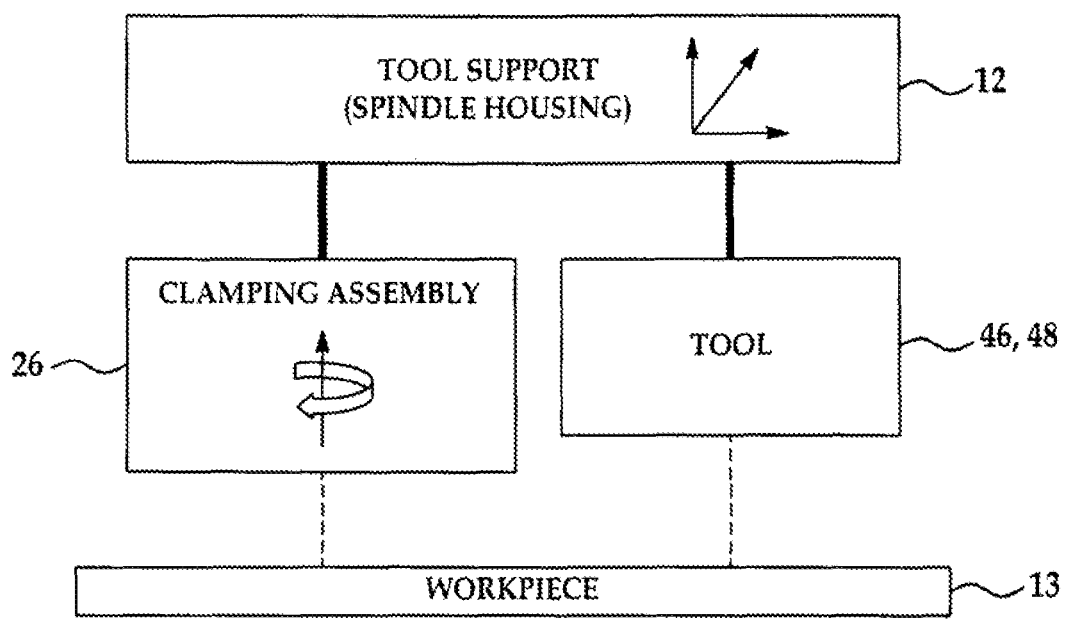
FIG. 1 is a functional block diagram illustrating a friction-stir welding head assembly, including a clamping assembly in accordance with an illustrative embodiment.

The different illustrative embodiments recognize and take into account a number of different considerations. For example, the different illustrative embodiments recognize and take into account conventional friction stir welding apparatuses may perform a single type of friction stir welding. The different illustrative embodiments recognize and take into account by providing releasable ancillary devices, different types of friction stir welding may be performed by a friction stir welding apparatus. Further, the different illustrative embodiments recognize and take into account by providing releasable ancillary devices at least one of clamping and positioning a friction stir welding pin tool may be performed more easily or more efficiently than conventional methods.

The different illustrative embodiments further recognize and take into account a friction stir welding apparatus may provide utilities such as electrical power, pneumatic power, feedback signals, and cooling to releasable ancillary devices. The illustrative embodiments recognize and take into account that by a friction stir welding apparatus providing utilities to an ancillary device, the ancillary device may be smaller. Further, by using an ancillary device rather than an autonomous device, cost may be reduced. Cost may be reduced by not providing separate utilities or additional tooling. Yet further, the ancillary device may be controlled by the same control system which drives the friction stir welding pin tool.

The illustrative embodiments recognize and take into account by using releasable ancillary devices, a positional location of the releasable ancillary device during operation may be provided to the controller. The illustrative embodiments recognize and take into account having a positional location of the releasable ancillary device may enable synchronization between a machine coordinate system of the friction stir welding apparatus and the ancillary device.

The different illustrative embodiments further recognize and take into account that ancillary devices which are moveable about a first axis independent of movement of the tool may reduce manufacturing cost or manufacturing time. Further, the different illustrative embodiments further recognize and take into account that ancillary devices which are moveable about a first axis independent of movement of the tool may facilitate a variety of specialty welding processes using a friction stir welding apparatus.

Referring first to FIGS. 1-7, a FSW head 10 (FIG. 1a) includes a tool support comprising a spindle housing 12 pivotally mounted on a yolk 18 by a pair of mounting arms 24 received in pivots 16 on the yolk 18. The mounting arms 24 form part of a saddle attachment 22 that may be secured to the spindle housing 12. Arms 24 mount the spindle housing 12 for rotation about the "A" axis.

Figure 1A:
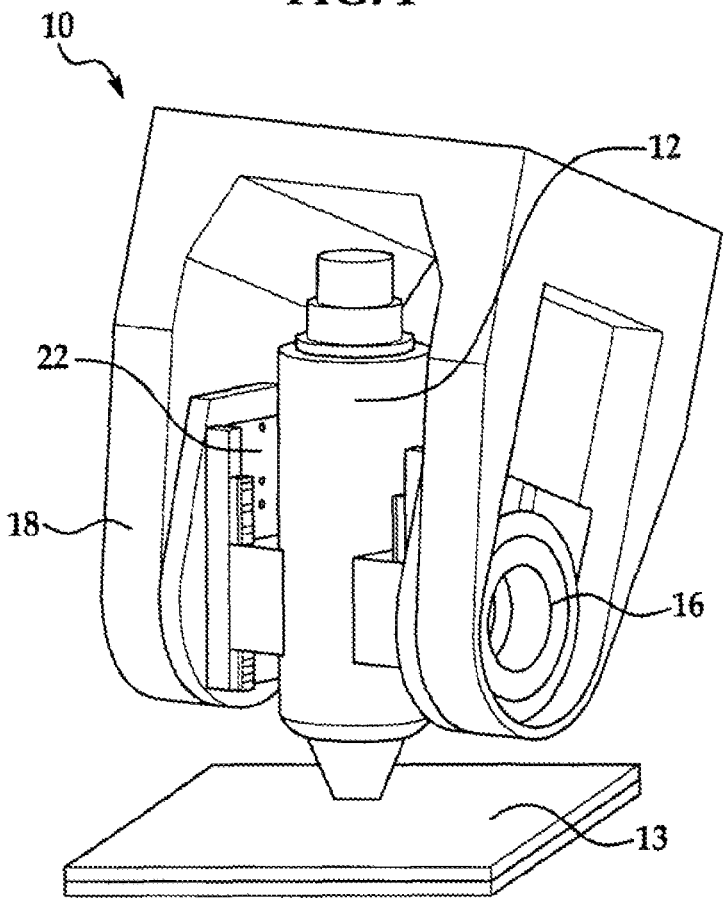
FIG. 1a is an isometric illustration of a friction-stir welding head assembly in accordance with an illustrative embodiment.
Figure 2:
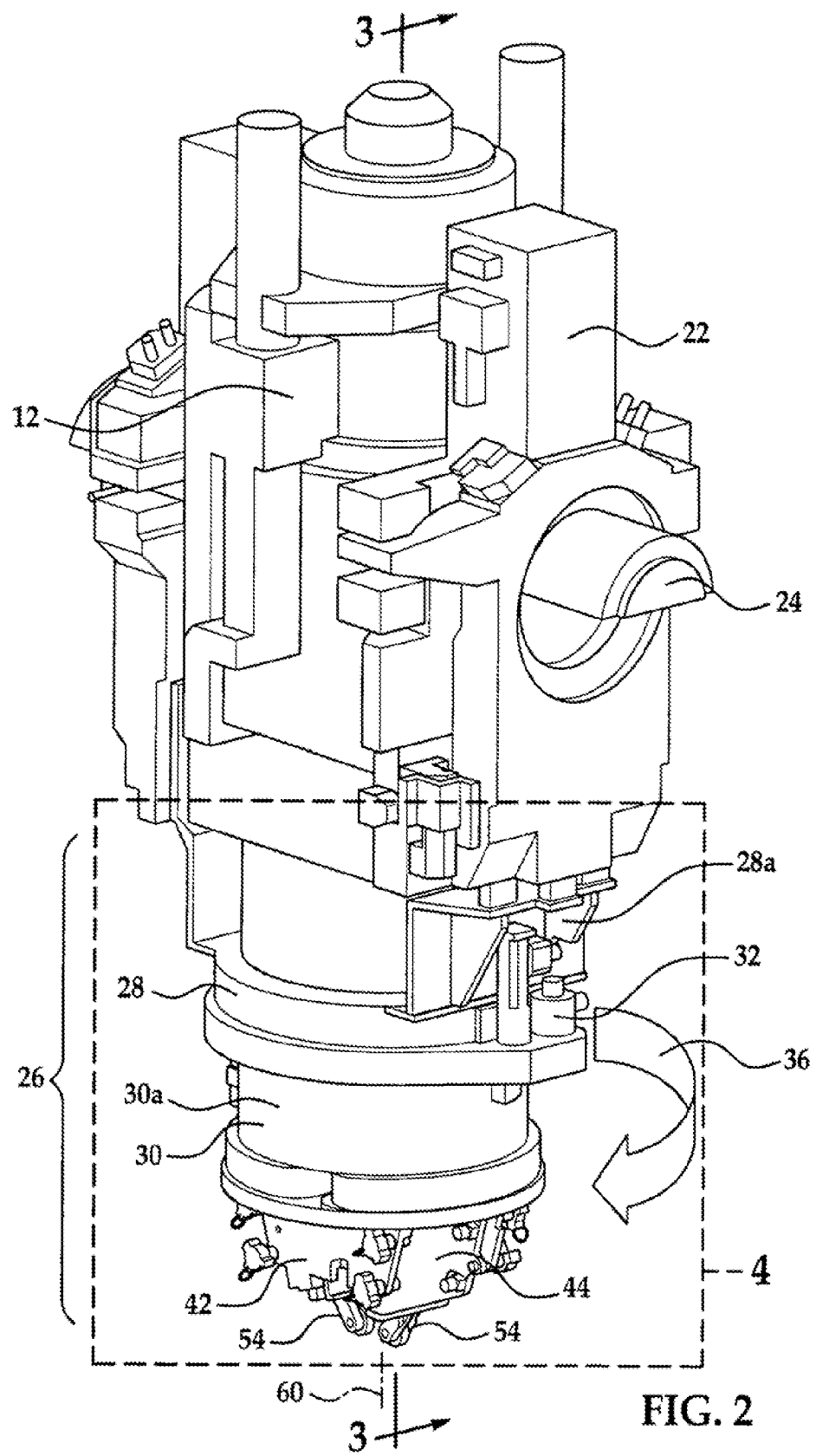
FIG. 2 is an isometric illustration of a friction-stir welding spindle housing and workpiece clamping apparatus in accordance with an illustrative embodiment.
Figure 3:
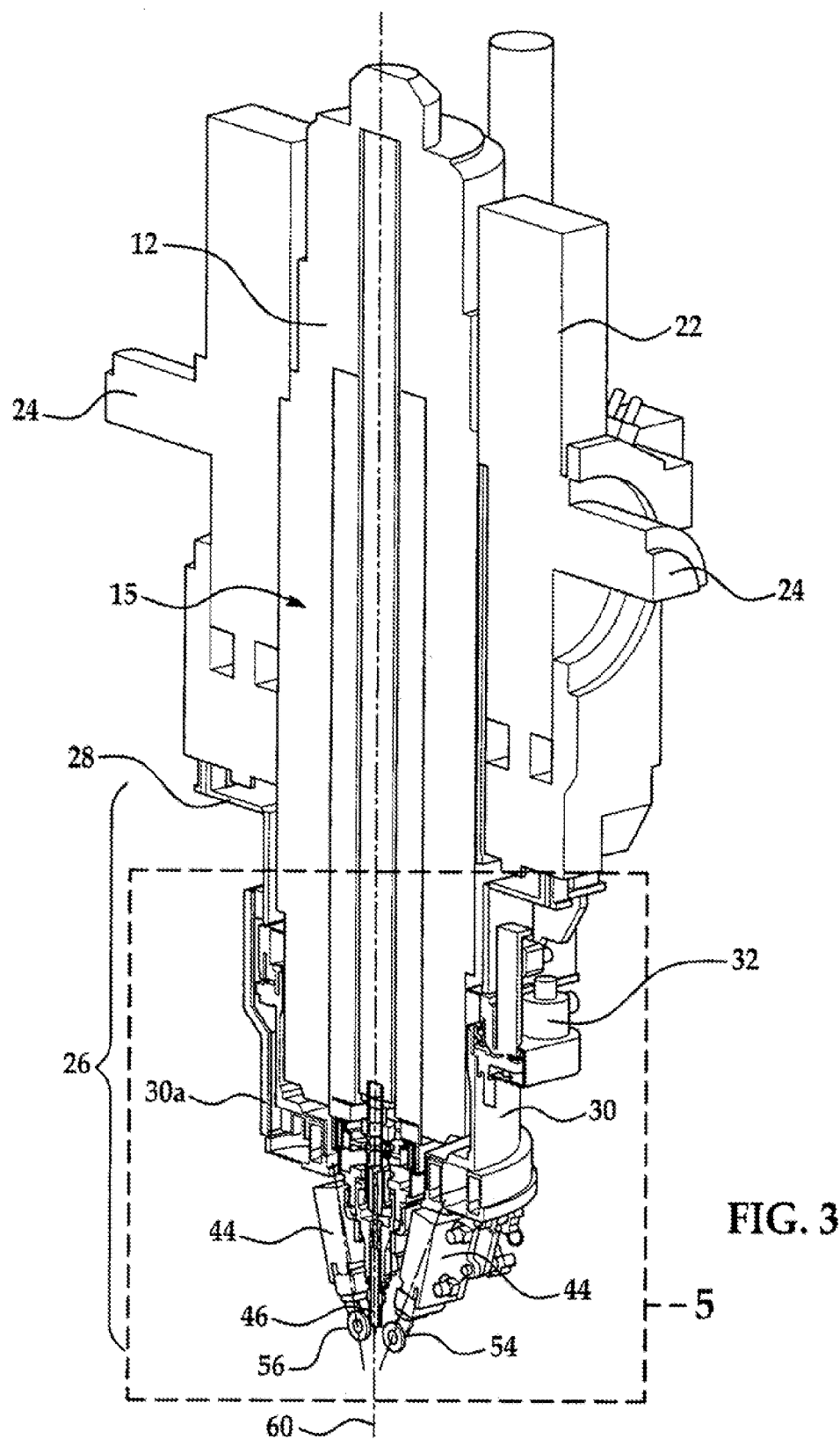
FIG. 3 is a sectional illustration taken along the line 3-3 in FIG. 2 in accordance with an illustrative embodiment.
Figure 4:
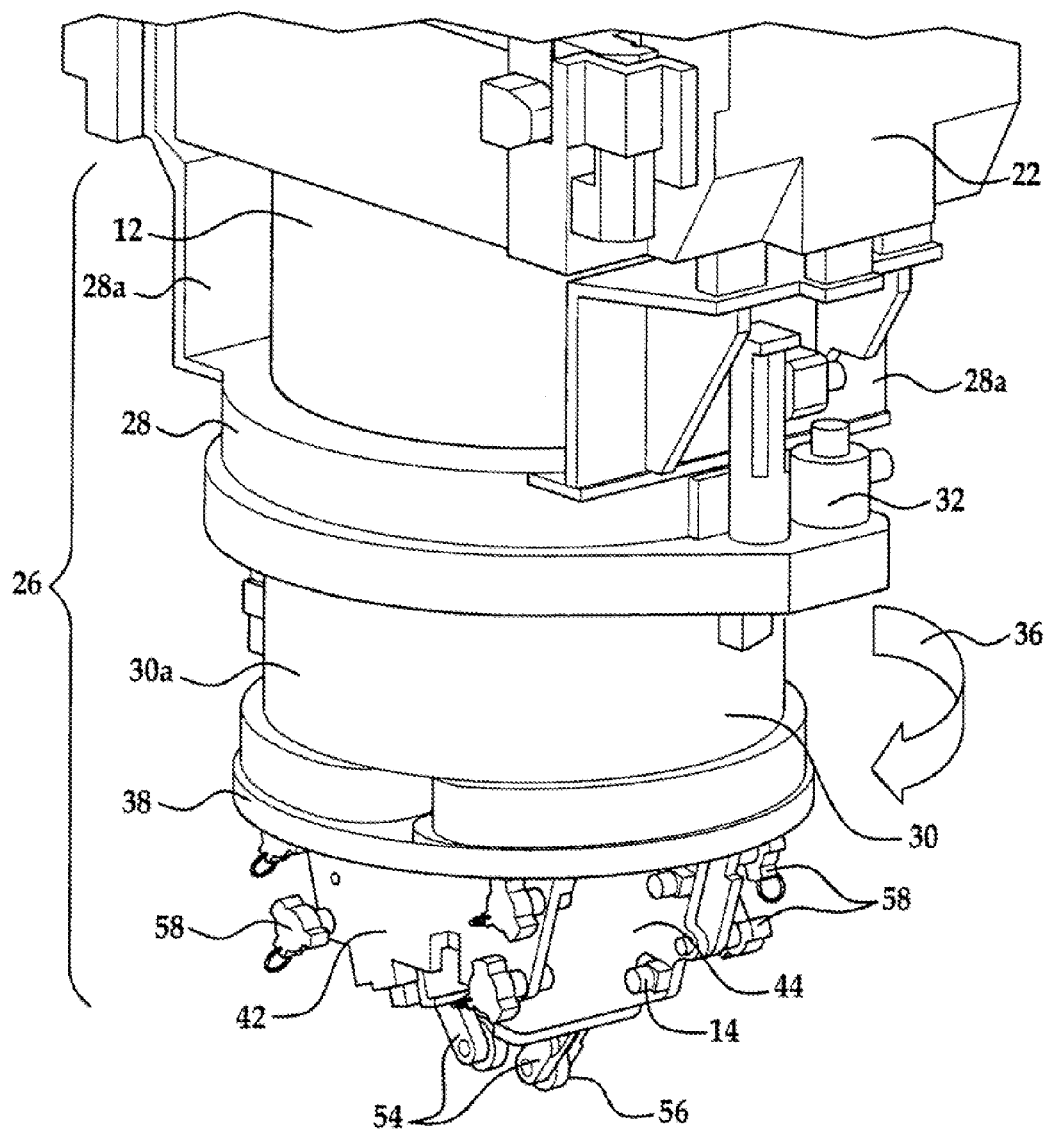
FIG. 4 is an enlarged illustration of the area designated as "FIG. 4" in FIG. 2 in accordance with an illustrative embodiment.
Figure 5:
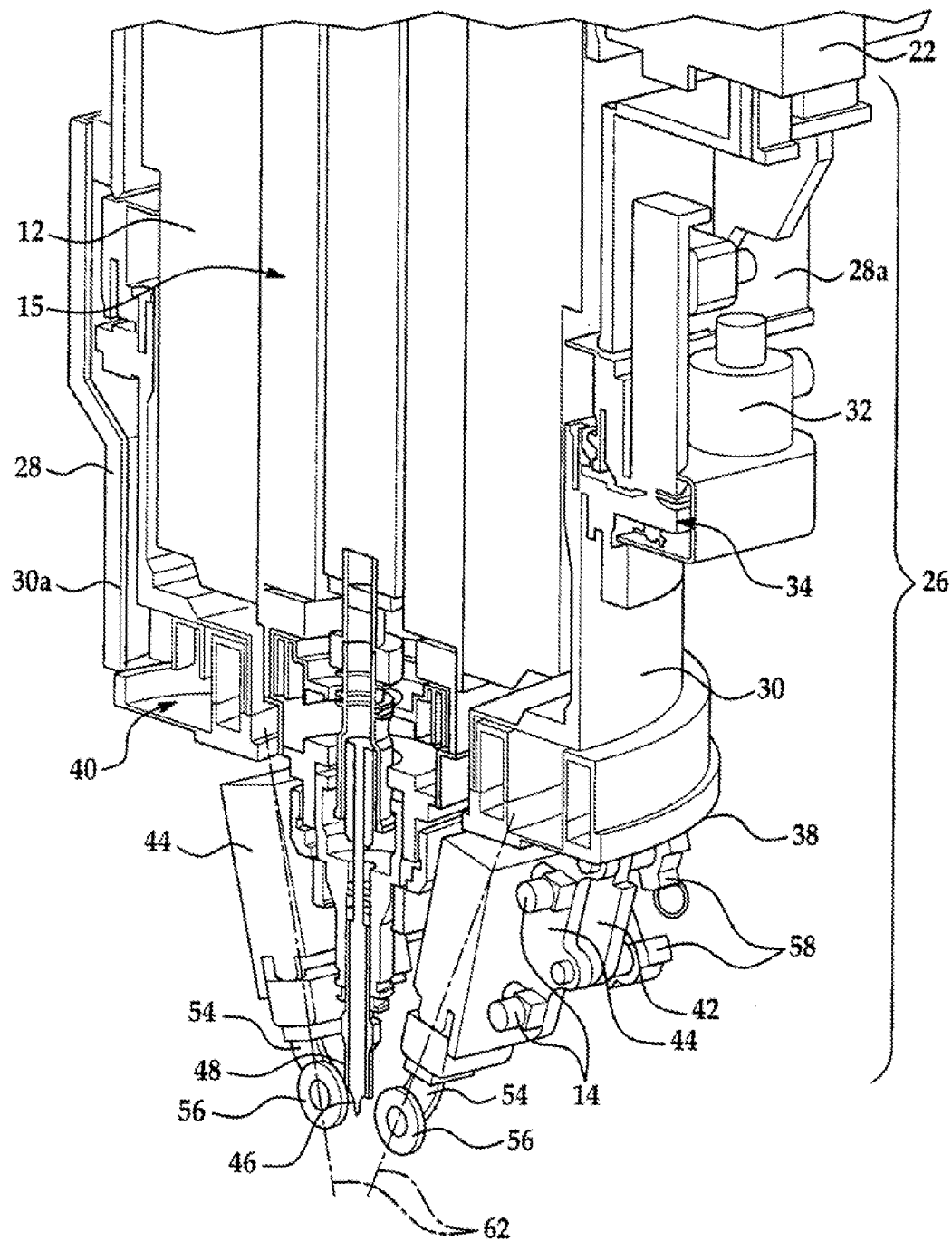
FIG. 5 is an enlarged, sectional illustration of the area designated as "FIG. 5" in FIG. 3 in accordance with an illustrative embodiment.
Figure 6:
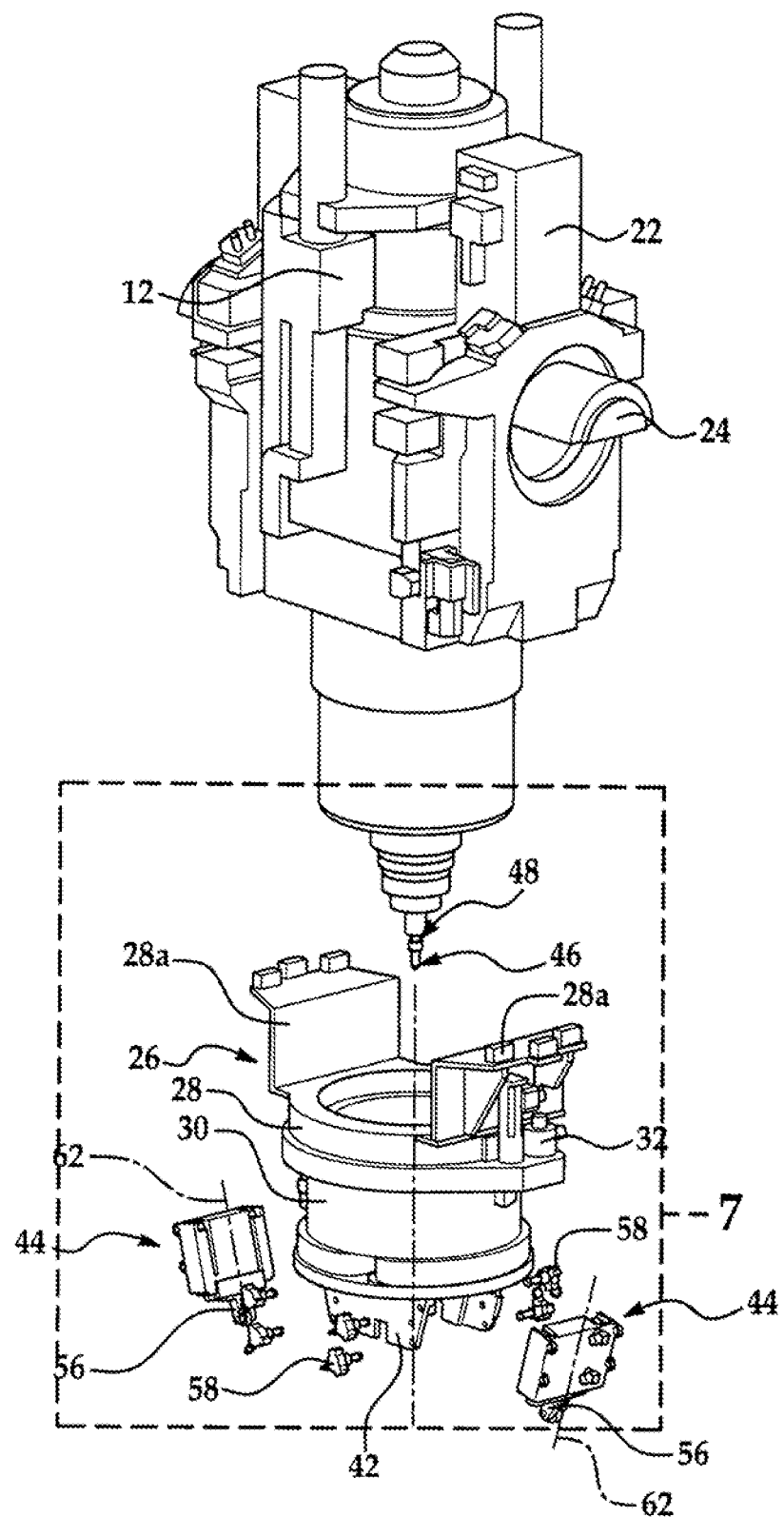
FIG. 6 is an exploded illustration of the FSW spindle and clamping apparatus shown in FIG. 2 in accordance with an illustrative embodiment.

The spindle housing 12 may contain a dual spindle drive 15 configured to separately drive, advance and retract an FSW welding pin tool 46, and a shoulder tool 48 concentrically surrounding the tip of the welding pin tool 46. Mounting of the spindle housing 12 on the pivot 16 enables the angle of the spindle housing 12, and thus that of the tools 46, 48 to be adjusted with respect to a workpiece 13 (FIG. 1a). The spindle housing 12 may also be mounted on a track 22 (FIG. 1a), permitting the tools 46, 48 to be advanced toward and away from the workpiece 13. It should be noted here that while a FSW tool 46 and shoulder tool 48 have been illustrated, various other tools may be employed for performing operations on a workpiece 13 where clamping of the workpiece 13 may be necessary or desirable.

In order to clamp the workpiece 13 during an FSW welding operation, a clamping assembly generally indicated by the numeral 26 may be mounted on the spindle housing 12. The clamping assembly 26 broadly comprises a stationary portion 28, a rotatable portion 30, and a pair of opposing roller clamp packs 44 disposed on opposite sides of the FSW tool 46. The stationary portion 28 may surround the spindle housing 12 and includes a pair of brackets 28a respectively secured to the saddles 22. The rotatable portion 30 may include a generally cylindrical housing 30a mounted, as by bearings (not shown) on the stationary portion 28 for rotation about an axis 60 that may be independent of the axes of movement of the FSW tool 46, and shoulder tool 48. Housing 30a may be also connected to the stationary portion 28 by a rack and pinion gear assembly 34 which may be driven by a motor 32 mounted on the stationary portion 28. The motor 32 may comprise, for example, without limitation, an AC electric stepper motor including an incorporated encoder (not shown) that generates signals representing the rotational position of the housing 30a about the independent axis 60.

The lower portion of the housing 30a may include a circumferential conduit 40 which may house electrical lines and pneumatic control lines (not shown). A ring shaped, removable plate 38 may be mounted on the bottom of the housing 30a, as for example and without limitation, by screws to allow access to the conduit 40.

A pair of downwardly depending, spaced apart flanges 42 may be secured to the bottom of the plate 38, and provide a support for mounting the roller clamp packs 44. Ball lock pins 58 releasably attach the roller clamp packs 44 on the flanges 42. The ball lock pins 58 provide a quick release means of mounting the roller clamp packs 44 so that they may be easily removed and replaced with any of a variety of interchangeable clamping member configurations.

Figure 7:
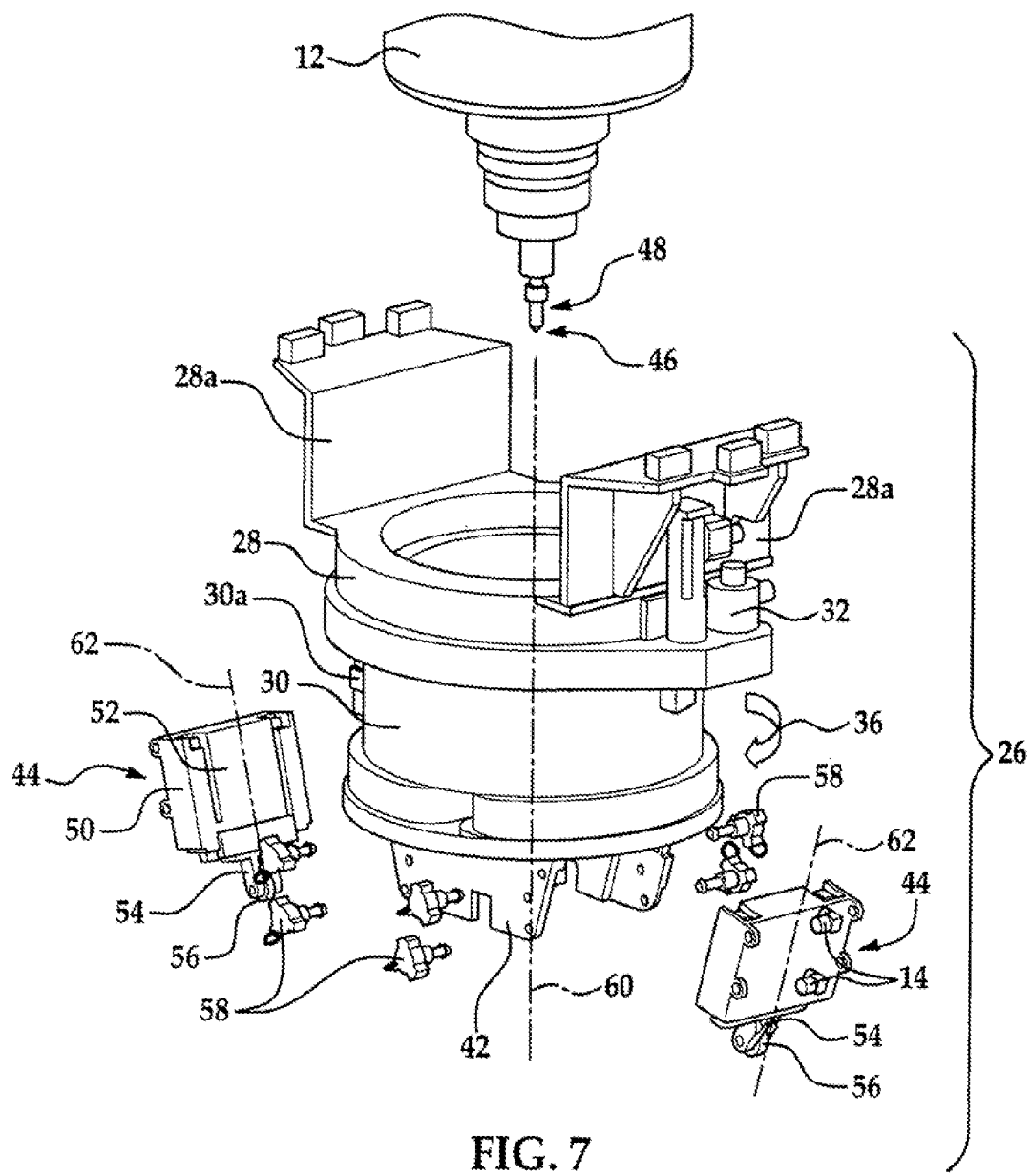
FIG. 7 is an enlarged illustration of the area designated as "FIG. 7" in FIG. 6 in accordance with an illustrative embodiment.

As best seen in FIG. 7, each of the roller clamp packs 44 may include a generally rectangular housing 50 in which a slide member 52 is mounted for confined sliding movement within housing 50 along an axis 62 that is inclined with respect to the central axis 60 of the FSW tool 46. The movement of the slide member 52 along axis 62 may be independent of the axes of movement (not shown) of the FSW tool 46 and shoulder tool 48. A bifurcated arm 54 may be secured to the bottom of the slide member 52. A clamping roller 56 may be rotatably mounted on the bottom of each of the arms 54.

It should be noted here that although a pair of opposing roller clamp packs 44 have been illustrated, fewer or a greater number of the roller clamp packs 44 may be employed, depending on the operation to be performed on the workpiece 13. The housing 50 may include a pneumatic cylinder (not shown) which may be connected to drive the slide members 52 using pressurized air delivered from a source (not shown) to the roller clamp packs 54 via pneumatic connections 14 (see FIGS. 4, 5 and 7). The delivery of this pressurized air to the roller clamp packs 44 causes slide members 52 to move downwardly, thereby extending the arm 54 until the clamping roller 56 engages the workpiece 13 and applies a controlled amount of clamping pressure to the workpiece 13.

Figure 8:
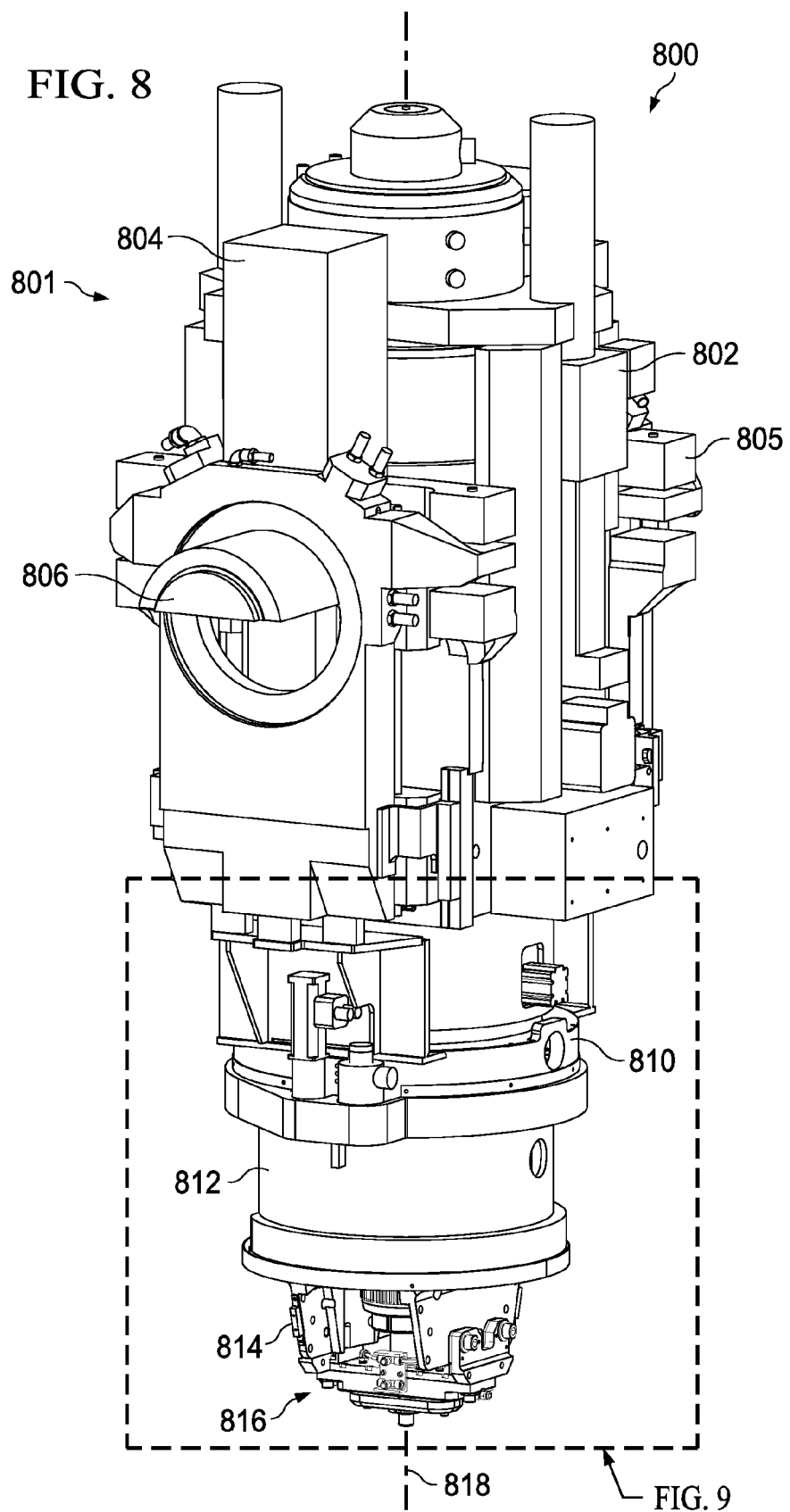
FIG. 8 is an illustration of an isometric view of a friction stir spot welding apparatus in accordance with an illustrative embodiment.

Referring now to FIG. 8, an illustration of an isometric view of a friction stir spot welding apparatus is depicted in accordance with an illustrative embodiment. Friction stir spot welding apparatus 800 may have parts similar to those of tool support spindle housing 12 of FIGS. 1-3. Friction stir spot welding apparatus 800 may be mounted in a yolk, such as yolk 18 of FIG. 1a. Friction stir spot welding apparatus 800 may work on a workpiece, such as workpiece 13 of FIG. 1.

Friction stir spot welding apparatus 800 comprises tool support 801. Tool support 801 comprises spindle housing 802, saddle attachment 804, saddle attachment 805, stationary portion 810, rotatable portion 812, and mounting plate 814. A tool may be mounted on tool support 801 for performing a manufacturing operation on a workpiece. In one illustrative example, a friction stir welding tool comprising a pin tool and a shoulder tool may be mounted within tool support 801. Specifically, a friction stir welding tool may be mounted within spindle housing 802.

Saddle attachment 804 may be secured to spindle housing 802. Saddle attachment 804 has mounting arm 806. Saddle attachment 805 may also have a mounting arm. Mounting arm 806 and the mounting arm of saddle attachment 805 may be used to mount spindle housing 802 for rotation about a first axis. For example, mounting arm 806 and the mounting arm of saddle attachment 805 may be used to mount spindle housing 802 for rotation within a pivot of a yolk such as yolk 18 of FIG. 1a. Mounting of spindle housing 802 within a pivot of a yolk may enable the angle of spindle housing 802, and thus of any tool within spindle housing 802, to be adjusted with respect to a workpiece. Spindle housing 802 may also be mounted on a track, such as track 22 of FIG. 1a. By mounting spindle housing 802 on a track, spindle housing 802 and thus any tool within spindle housing 802, may be advanced toward and away from a workpiece. Spindle housing 802 may contain a dual spindle drive configured to separately drive, advance and retract a pin tool and a shoulder tool surrounded by spindle housing 802.

Stationary portion 810 may surround a portion of spindle housing 802. Stationary portion 810 may be connected to saddle attachment 804 and saddle attachment 805 through any conventional securing method. In one illustrative example, stationary portion 810 may include brackets to respectively secure the stationary portion 810 to saddle attachment 804 and saddle attachment 805. As used herein, a first component "connected to" a second component means that the first component can be connected directly or indirectly to the second component. In other words, additional components may be present between the first component and the second component. The first component is considered to be indirectly connected to the second component when one or more additional components are present between the two components. When the first component is directly connected to the second component, no additional components are present between the two components.

Rotatable portion 812 may include a generally cylindrical housing connected to stationary portion 810 for rotation about axis 818. Rotation of rotatable portion 812 may be independent of movement about other axes of movement of a pin tool or shoulder tool surrounded by spindle housing 802. In one illustrative example, the generally cylindrical housing may be connected to the stationary portion 810 by a rack and pinion gear assembly which may be driven by a motor mounted on the stationary portion 810.

Mounting plate 814 may be mounted on the bottom of the rotatable portion 812. Mounting plate 814 may be mounted onto rotatable portion 812 using bolts, screws, or any suitable fasteners such that mounting plate 814 may be releasably mounted to rotatable portion 812.

Mounting plate 814 comprises a pair of downwardly depending, spaced apart flanges. In one illustrative example, the flanges may be integral to mounting plate 814. In another illustrative example, the flanges may be secured to mounting plate 814 using fasteners, welding, adhesives, or other suitable securing methods. Friction stir spot welding device 816 is connected to mounting plate 814. Specifically, friction stir spot welding device 816 may be mounted to the flanges of mounting plate 814.

The illustration of friction stir spot welding apparatus 800 in FIG. 8 is not meant to imply physical or architectural limitations to the manner in which an illustrative embodiment may be implemented. Other components in addition to or in place of the ones illustrated may be used. Some components may be unnecessary. For example, although not depicted in FIG. 8, a number of clamp packs, such as clamp packs 44 of FIGS. 2 and 3 could be also connected to mounting plate 814. Accordingly, a clamping assembly releasably mounted on the tool support for movement along the at least first axis independent of the movement of the tool may also be provided. This clamping assembly may comprise at least one clamping device for applying clamping pressure to the workpiece, the at least one clamping device comprising a roller clamp for engaging the workpiece and means for biasing the roller clamp against the workpiece.

Figure 9:
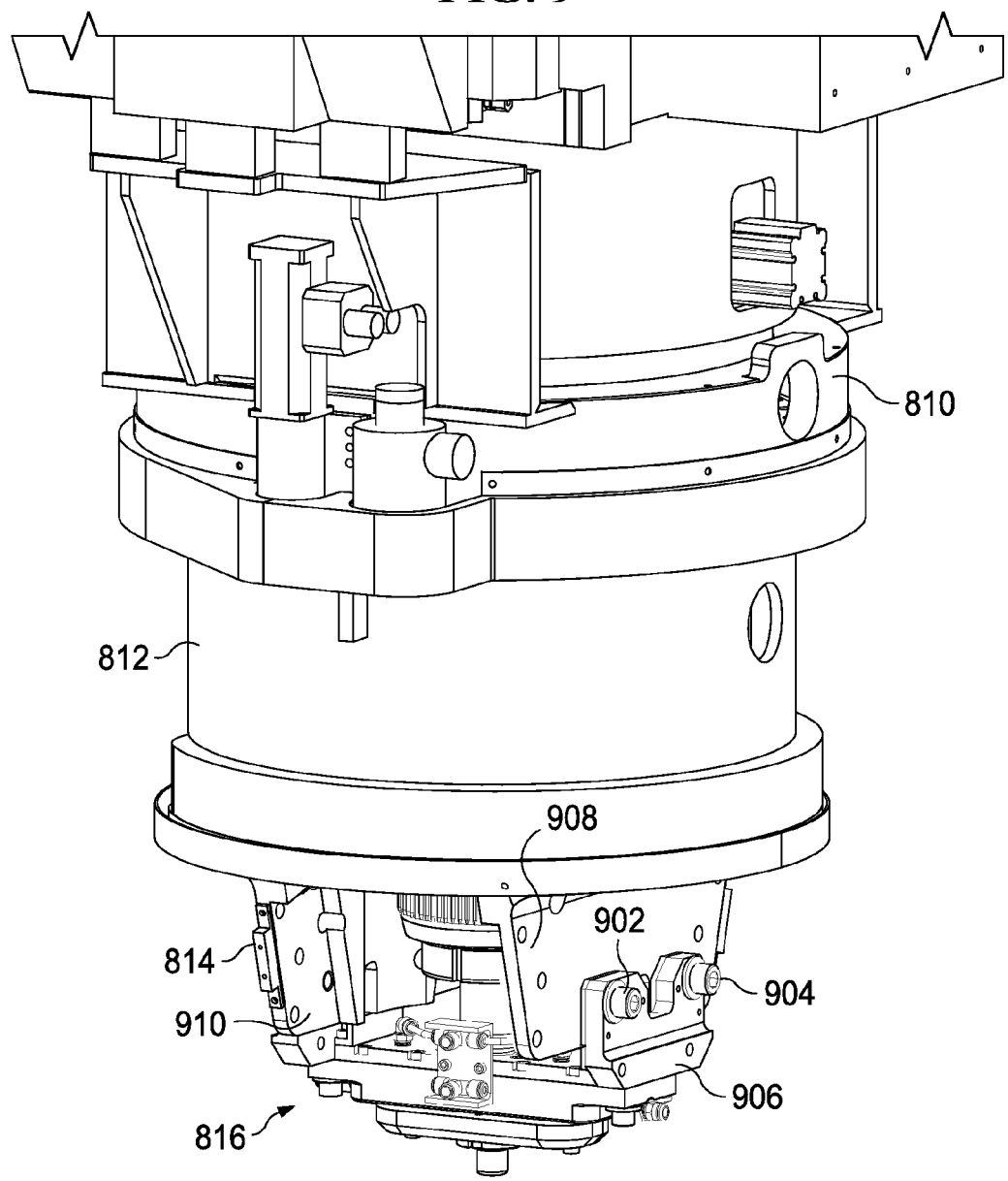
FIG. 9 is an enlarged illustration of the area designated as "FIG. 9" in FIG. 8 in accordance with an illustrative embodiment.

Turning now to FIG. 9, an enlarged illustration of the area designated as "FIG. 9" in FIG. 8 in accordance with an illustrative embodiment. As depicted, friction stir spot welding device 816 is mounted to mounting plate 814. Friction stir spot welding device 816 is mounted to a number of flanges of mounting plate 814. As used herein, a number of items means one or more items. For example, a number of flanges is one or more flanges. As depicted, mounting plate 814 has two spaced apart flanges, flange 908 and flange 910.

Although two flanges are depicted in FIG. 9, in other illustrative examples, mounting plate 814 may have any desired number of flanges. In one illustrative example, mounting plate 814 may have a single flange. In another illustrative example, mounting plate 814 may have three flanges.

As depicted, flange 908 and flange 910 may be integral to mounting plate 814. In some illustrative examples, flange 908 and flange 910 may be attached to mounting plate 814. In these illustrative examples, flange 908 and flange 910 may be attached to mounting plate 814 using fasteners, welding, adhesive, or any suitable method of attachment.

Friction stir spot welding device 816 is attached to mounting plate 814 using a number of fasteners. Specifically, fastening brace 906 is attached to flange 908 of mounting plate 814 using fastener 902 and fastener 904. Fastener 902 and fastener 904 may take the form of any type fastener such as bolts, screws, brads, or any other suitable fasteners. In some illustrative examples, fastener 902 and fastener 904 may take the form of bolts. Although two fasteners are shown as attaching fastening brace 906 to flange 908, in other illustrative examples any desirable number of fasteners may be used. Additional fasteners may attach an additional fastening brace to flange 910.

As depicted, friction stir spot welding device 816 is releasably mounted to mounting plate 814. Accordingly, friction stir spot welding device 816 is releasably mounted to tool support 801.

Friction stir spot welding device 816 may be referred to as an ancillary device. In some illustrative examples, friction stir spot welding device 816 may be removed from tool support 801. In these illustrative examples, friction stir spot welding device 816 may be replaced with another type of ancillary device.

Figure 10:
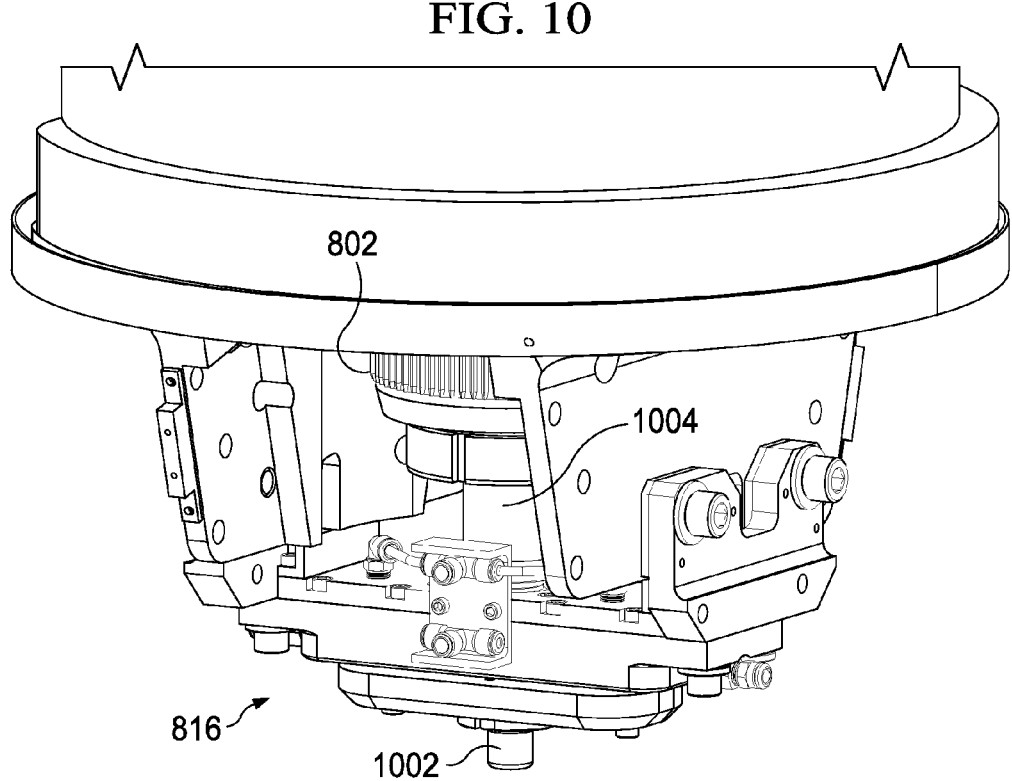
FIG. 10 is an enlarged illustration of the area designated as "FIG. 10" in FIG. 9 in accordance with an illustrative embodiment.

Turning now to FIG. 10, an enlarged illustration of the area designated as "FIG. 10" in FIG. 9 is depicted in accordance with an illustrative embodiment. As depicted, friction stir spot welding device 816 is releasably mounted to mounting plate 814. As depicted, spindle housing 802 passes through mounting plate 814. A pin tool and shoulder tool surrounded by spindle housing 802 is inserted into material capture ring 1002.

Figure 11:
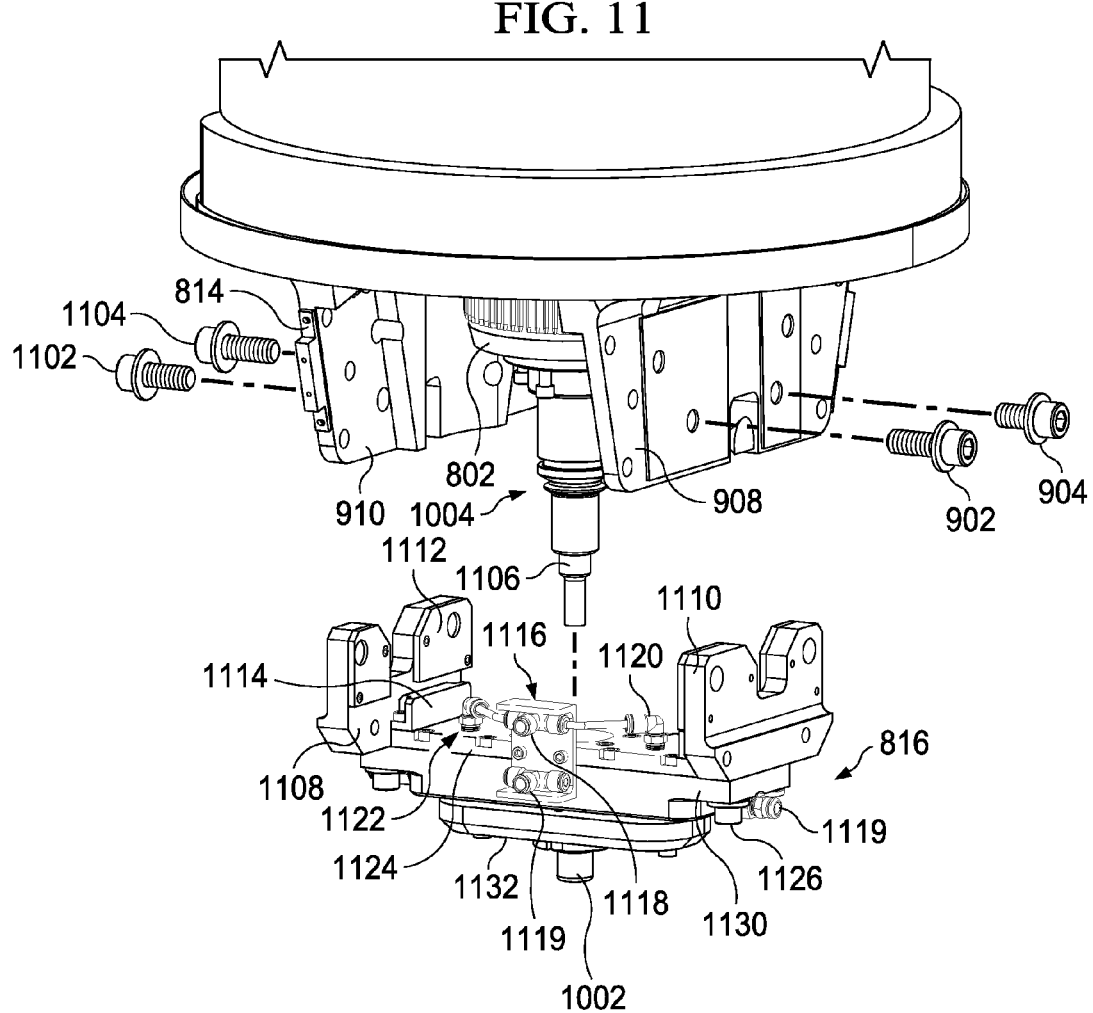
FIG. 11 is a partially exploded illustration of the apparatus in FIG. 10 in accordance with an illustrative embodiment.

Turning now to FIG. 11, a partially exploded illustration of the apparatus in FIG. 10 is depicted in accordance with an illustrative embodiment. As depicted, spindle housing 802 passes through mounting plate 814. Portions of shoulder tool 1106 protrude from spindle housing 802. When assembled, shoulder tool 1106 is inserted into material capture ring 1002 of friction stir spot welding device 816.

Friction stir spot welding device 816 is attached to mounting plate 814 using fastener 902, fastener 904, fastener 1102, and fastener 1104. Fastener 902 and fastener 904 may be used to attach fastening brace 906 to flange 908. Fastener 1102 and fastener 1104 may be used to attach fastening brace 1108 to flange 910. Shims such as shim 1112 may be attached to at least one of fastening brace 906 or fastening brace 1108. Shim 1112 may be attached to fastening brace 1108 to account for machine tolerances in manufacturing at least one of mounting plate 814 and fastening brace 1108. As used herein, the phrase "at least one of", when used with a list of items, means different combinations of one or more of the listed items may be used and only one of each item in the list may be needed. For example, "at least one of item A, item B, and item C" may include, without limitation, item A or item A and item B. This example also may include item A, item B, and item C or item B and item C.

Stop 1114 may be attached to at least one of fastening brace 1108 and plate 1124. Stop 1114 may be used to limit upward movement of friction stir spot welding device 816 towards mounting plate 814 prior to attaching friction stir spot welding device 816 to mounting plate 814. Flange 910 of mounting plate 814 may contact stop 1114 when friction stir spot welding device 816 is attached to mounting plate 814. As a result, stop 1114 may function as an alignment aid in attaching friction stir spot welding device 816 to mounting plate 814.

When assembled, shoulder tool 1106 is inserted into material capture ring 1002. Thus shoulder tool 1106 extends through plate 1124, body 1130, and base 1132 of friction stir spot welding device 816. As depicted, base 1132 is associated with body 1130. Base 1132 may be indirectly connected to body 1130 using a number of pistons secured to base 1132. Body 1130 is connected to fastening brace 906 and fastening brace 1108 using a number of fasteners including fastener 1126. Body 1130 is also connected to plate 1124. Body 1130 may be connected to plate 1124 using bolts, screws, brads, or any suitable fasteners.

Friction stir spot welding device 816 also has pneumatic port 1118, pneumatic port 1119, connection 1120, and connection 1122. Pneumatic port 1118 and pneumatic port 1119 are connected to pneumatic utilities provided by tool support 801. Pneumatic port 1118 may supply pneumatic power for clamping of base 1132 during friction stir spot welding. Pneumatic power for clamping may be supplied via connection 1120 and connection 1122 through plate 1124. Pneumatic port 1119 may supply pneumatic power for retracting base 1132. Guard 1116 may protect pneumatic port 1118, pneumatic port 1119, and associated pneumatic tubing from rotation by spindle 1004.

Figure 12:
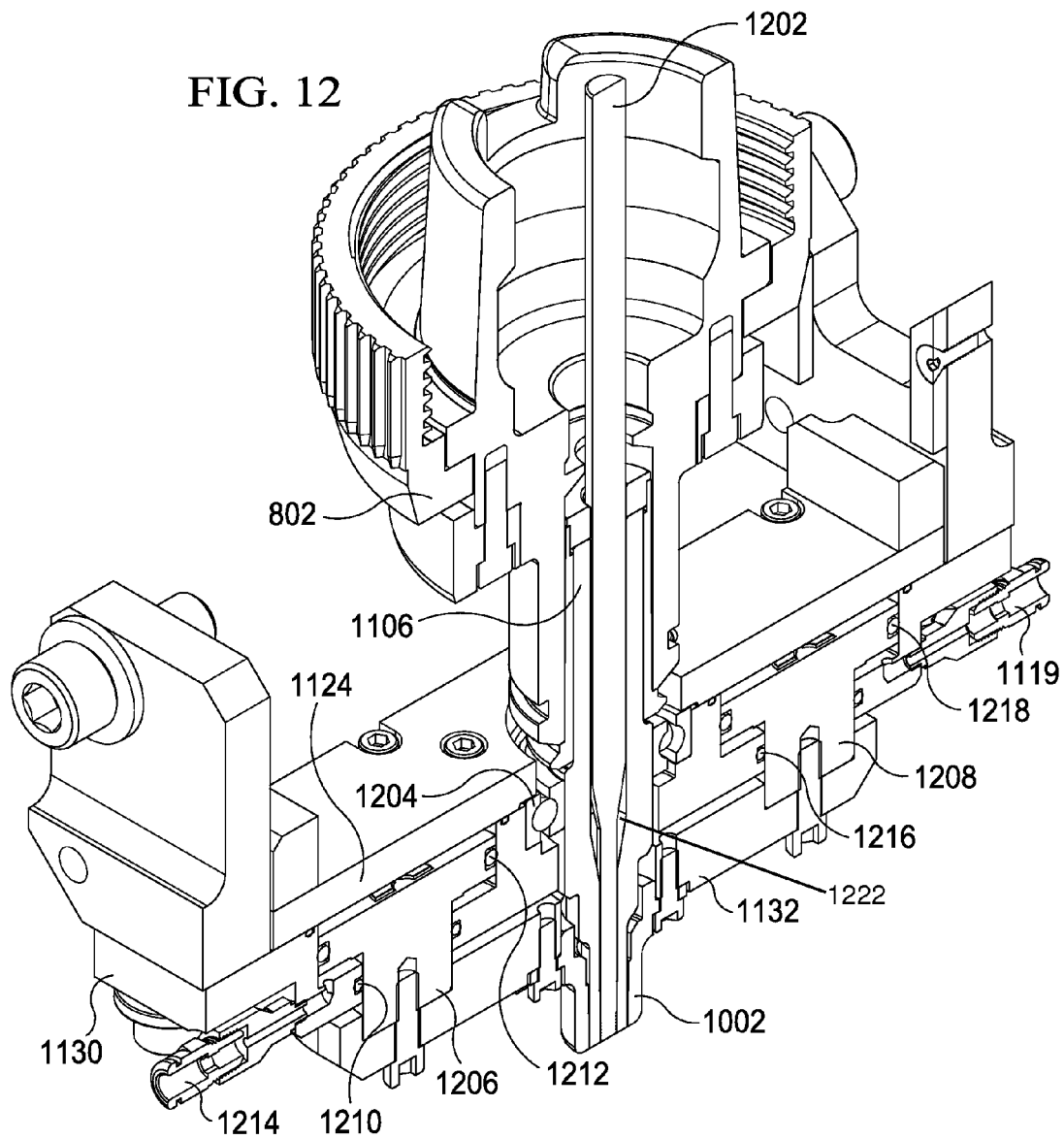
FIG. 12 is an illustration of a cross-section view of FIG. 11 along line 12 in accordance with an illustrative embodiment.

Turning now to FIG. 12, an illustration of a cross-section view of FIG. 11 along line 12 is depicted in accordance with an illustrative embodiment. As depicted, pin tool 1202 is surrounded by shoulder tool 1106. Both pin tool 1202 and shoulder tool 1106 are inserted into material capture ring 1002. Material capture ring 1002 is attached to base 1132 by a number of fasteners. Base 1132 is attached to piston 1206 and piston 1208. Piston 1206 and piston 1208 are seated within respective cavities formed by body 1130 and plate 1124. Piston 1206 and its respective cavity form a first pneumatic cylinder. As pneumatic power is used to move piston 1206 both up and down, this first pneumatic cylinder may be referred to as a double-acting pneumatic cylinder. Piston 1208 and its respective cavity form a second double acting pneumatic cylinder. Although two pneumatic cylinders are shown in this illustrative example, any desired number of pneumatic cylinders may be implemented.

During clamping of base 1132, connection 1120 and connection 1118 of FIG. 11 may be used to provide pneumatic power to piston 1208 and piston 1206 through plate 1124. During retraction of base 1132, connection 1214 and connection 1119, connected to the respective cavities of piston 1206, and piston 1208 are used to provide pneumatic power.

A number of o-rings may be provided to provide a pneumatic seal between piston 1206 and at least one of base 1132 and body 1130. As depicted, o-ring 1210 and o-ring 1212 are provided. A number of o-rings may be provided to provide a pneumatic seal between piston 1208 and at least one of base 1132 and body 1130. As depicted, o-ring 1216 and o-ring 1218 are provided.

During operation of the friction stir spot welding device 816, material capture ring 1002 is clamped to a workpiece by clamping base 1132. Following clamping of base 1132, pin tool 1202 is rotated. Following pin tool 1202 rotation, pin tool 1202 may be retracted while shoulder tool 1106 is plunged into the workpiece. Throughout a friction stir spot welding process, respective rotations of tool 1202 and shoulder tool 1204 are independent of movement of material capture ring 1002 of friction stir spot welding device 816. Further, throughout a friction stir spot welding process, respective movements of tool 1202 and shoulder tool 1204 towards and away from a workpiece may be independent of movement of material capture ring 1002 of friction stir spot welding device 816.

Positional bearing 1204 provides a first axis location and a second axis location for the friction stir spot welding device 816. In one illustrative example, positional bearing 1204 may comprise an angular contact bearing configured to provide a number of axis locations for friction stir spot welding device 816. Capture area 1222 may capture material from the workpiece during the friction stir spot welding operation. Prior to retracting base 1132, pin tool 1202 and shoulder tool 1204 may be plunged towards workpiece to push out any material gathered within capture area 1222.

Figure 13:
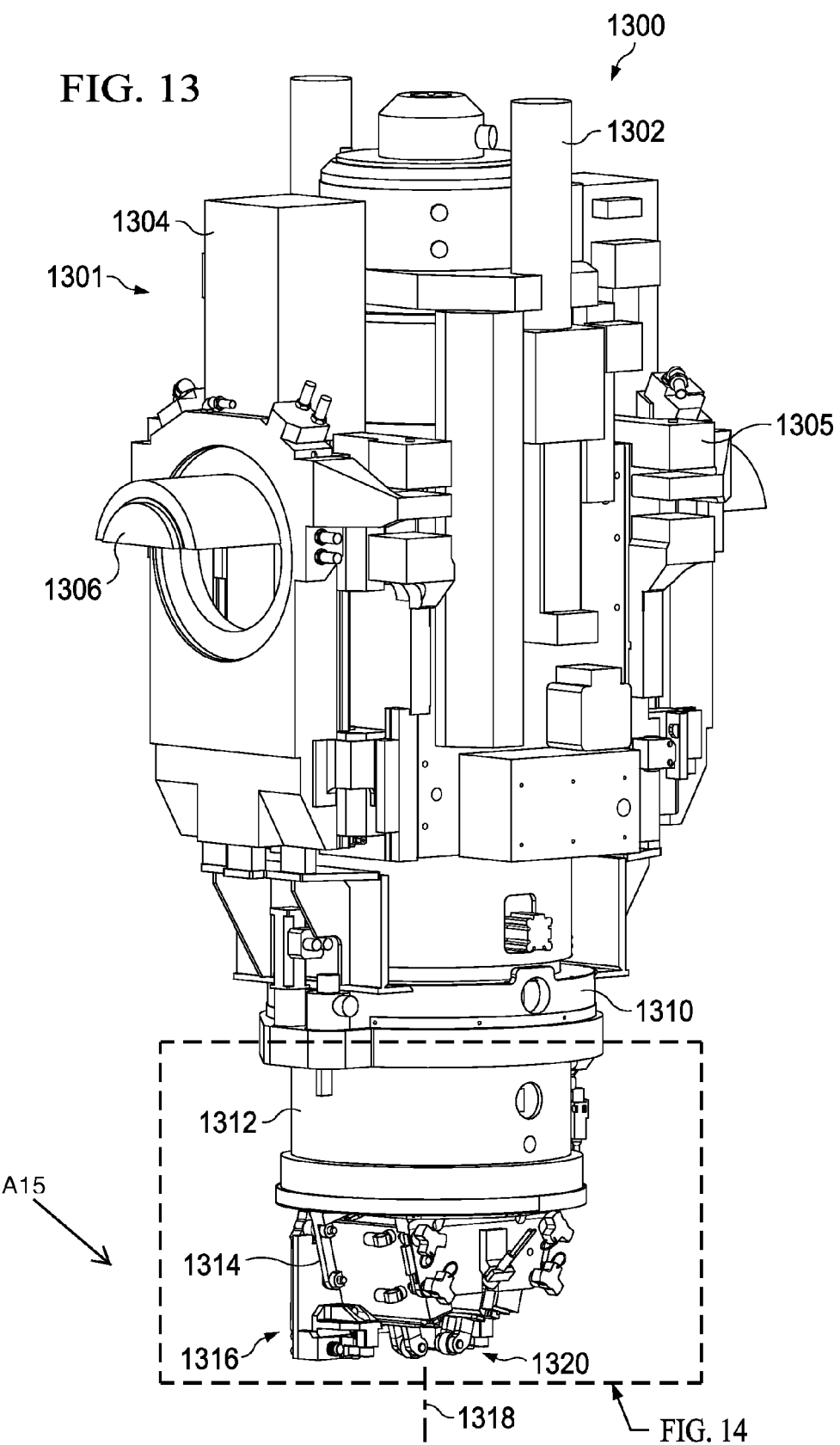
FIG. 13 is an illustration of an isometric view of a friction stir welding apparatus in accordance with an illustrative embodiment.

Turning now to FIG. 13, an illustration of an isometric view of a friction stir welding apparatus is depicted in accordance with an illustrative embodiment. Friction stir welding apparatus 1300 may have parts similar to those of tool support spindle housing 12 of FIGS. 1-3. Friction stir welding apparatus 1300 may be mounted in a yolk, such as yolk 18 of FIG. 1a. Friction stir welding apparatus 1300 may work on a workpiece, such as workpiece 13 of FIG. 1.

Friction stir welding apparatus 1300 comprises tool support 1301. Tool support 1301 comprises spindle housing 1302, saddle attachment 1304, saddle attachment 1305, stationary portion 1310, rotatable portion 1312, and mounting plate 1314. A tool may be mounted on tool support 1301 for performing a manufacturing operation on a workpiece. In one illustrative example, a friction stir welding tool comprising a pin tool and a shoulder tool may be mounted within tool support 1301. Saddle attachment 1304 may be secured to spindle housing 1302. Saddle attachment 1304 has mounting arm 1306. Saddle attachment 1305 may also have a mounting arm.

Mounting arm 1306 and the mounting arm of saddle attachment 1305 may be used to mount spindle housing 1302 for rotation about a first axis. For example, mounting arm 1306 and the mounting arm of saddle attachment 1305 may be used to mount spindle housing 1302 for rotation within a pivot of a yolk such as yolk 18 of FIG. 1a. Mounting of spindle housing 1302 within a pivot of a yolk may enable the angle of spindle housing 1302, and thus of any tool within spindle housing 1302, to be adjusted with respect to a workpiece. Spindle housing 1302 may also be mounted on a track, such as track 22 of FIG. 1a. By mounting spindle housing 1302 on a track, spindle housing 1302 and thus any tool within spindle housing 1302, may be advanced toward and away from a workpiece. Spindle housing 1302 may contain a dual spindle drive configured to separately drive, advance and retract a pin tool and a shoulder tool surrounded by spindle housing 1302.

Stationary portion 1310 may surround the spindle housing 1302. Stationary portion 1310 may be connected to saddle attachment 1304 and saddle attachment 1305 through any conventional securing method. In one illustrative example, stationary portion 1310 may include brackets to respectively secure the stationary portion 1310 to saddle attachment 1304 and saddle attachment 1305.

Rotatable portion 1312 may include a generally cylindrical housing connected to stationary portion 1310 for rotation about axis 1318. Rotation of rotatable portion 1312 may be independent of movement about other axes of movement of a pin tool or shoulder tool surrounded by spindle housing 1302. In one illustrative example, the generally cylindrical housing may be connected to the stationary portion 1310 by a rack and pinion gear assembly which may be driven by a motor mounted on the stationary portion 1310.

Mounting plate 1314 may be mounted on the bottom of the rotatable portion 1312. Mounting plate 1314 may be mounted onto rotatable portion 1312 using bolts, screws, or any suitable fasteners such that mounting plate 1314 may be releasably mounted to rotatable portion 1312.

Mounting plate 1314 comprises a pair of downwardly depending, spaced apart flanges. In one illustrative example, the flanges may be integral to mounting plate 1314. In another illustrative example, the flanges may be secured to mounting plate 1314 using fasteners, welding, adhesives, or other suitable securing methods. Structural positioning system 1316 is connected to mounting plate 1314. Specifically, structural positioning system 1316 may be mounted to a flange of mounting plate 1314. Clamping assembly 1320 is also connected to mounting plate 1314. Specifically, clamping assembly 1320 is connected to both flanges of mounting plate 1314.

The illustration of friction stir welding apparatus 1300 in FIG. 13 is not meant to imply physical or architectural limitations to the manner in which an illustrative embodiment may be implemented. Other components in addition to or in place of the ones illustrated may be used.

Figure 14:
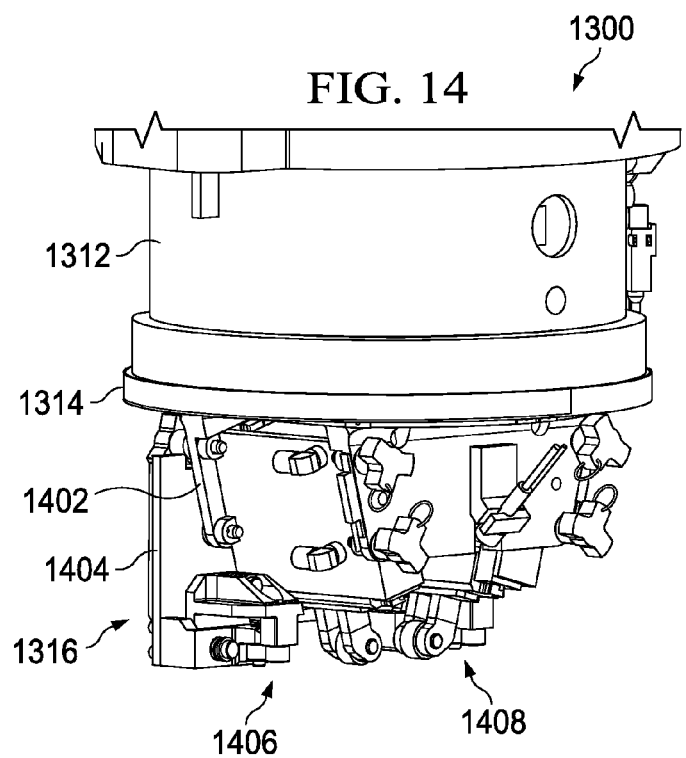
FIG. 14 is an enlarged illustration of the area designated as "FIG. 14" in FIG. 13 in accordance with an illustrative embodiment.

Turning now to FIG. 14, an enlarged illustration of the area designated as "FIG. 14" in FIG. 13 is depicted in accordance with an illustrative embodiment. As depicted, structural positioning system 1316 is mounted to mounting plate 1314. Structural positioning system 1316 is mounted to a number of flanges of mounting plate 1314. As depicted, mounting plate 1314 has two spaced apart flanges. Although two flanges are depicted in FIG. 14, in other illustrative examples, mounting plate 1314 may have any desired number of flanges. In one illustrative example, mounting plate 1314 may have a single flange. In another illustrative example, mounting plate 1314 may have three flanges.

As depicted, flange 1402 may be integral to mounting plate 1314. In some illustrative examples, flange 1402 may be attached to mounting plate 1314. In these illustrative examples, flange 1402 may be attached to mounting plate 1314 using fasteners, welding, adhesive, or any suitable method of attachment.

Structural positioning system 1316 comprises attachment plate 1404, roller assembly 1406, and roller assembly 1408. Attachment plate 1404 of structural positioning system 1316 is attached to mounting plate 1314 using a number of fasteners. Structural positioning system 1316 may be releasably mounted to mounting plate 1314. Accordingly, structural positioning system 1316 may be releasably mounted to tool support 1301. Structural positioning system 1316 may be referred to as an ancillary device. In some illustrative examples, structural positioning system 1316 may be removed from tool support 1301. In these illustrative examples, structural positioning system 1316 may be replaced with another type of ancillary device.

Figure 15:
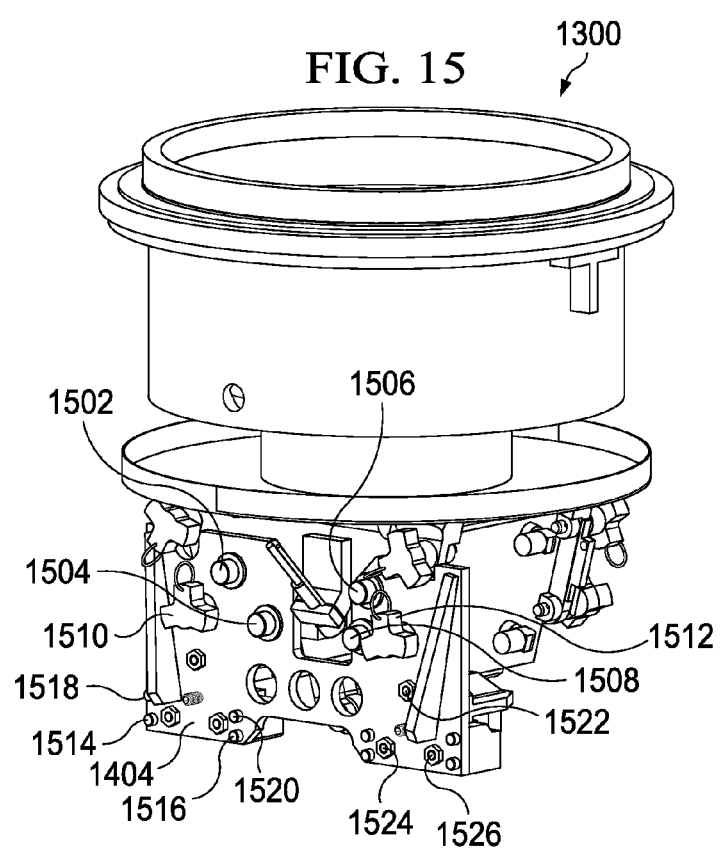
FIG. 15 is an enlarged illustration of the area designated as "FIG. 15" from direction 15 in FIG. 13 in accordance with an illustrative embodiment.

Turning now to FIG. 15, an enlarged illustration of the area designated as "FIG. 15" from direction A15 in FIG. 13 is depicted in accordance with an illustrative embodiment. As depicted, attachment plate 1404 of structural positioning system 1316 is attached to flange 1402. Specifically, attachment plate 1404 of structural positioning system 1316 is attached to flange 1402 using fastener 1502, fastener 1504, fastener 1506, and fastener 1508. Fastener 1514, fastener 1516, faster 1518, and fastener 1520 may attach attachment plate 1404 to roller assembly 1408. Specifically, fastener 1514, fastener 1516, faster 1518, and fastener 1520 may attach attachment plate 1404 to a locator roller bracket of roller assembly 1408. Fastener 1522, fastener 1524, fastener 1526 may attach attachment plate 1404 to roller assembly 1406. Specifically, fastener 1522, fastener 1524, fastener 1526 may moveably attach a tension roller bracket of roller assembly 1406 to attachment plate 1404. Each of roller assembly 1406 and roller assembly 1408 may have a respective locator roller bracket and a respective tension roller bracket. As a result, each of roller assembly 1406 and roller assembly 1408 may have a number of fasteners to attach the respective locator roller bracket and the respective tension roller bracket to attachment plate 1404. Thus structural position system 1316 may have a number of locator rollers and a number of tension rollers.

Assembly pin 1510 and assembly pin 1512 may be inserted through attachment plate 1404 and flange 1402. Further, assembly pin 1510 and assembly pin 1512 may be used to attach a first roller clamp pack and a second roller clamp pack respectively to attachment plate 1404. Assembly pin 1510 and assembly pin 1512 may also attach the first roller clamp pack and the second roller clamp pack respectively to mounting plate 1314.

Figure 16:
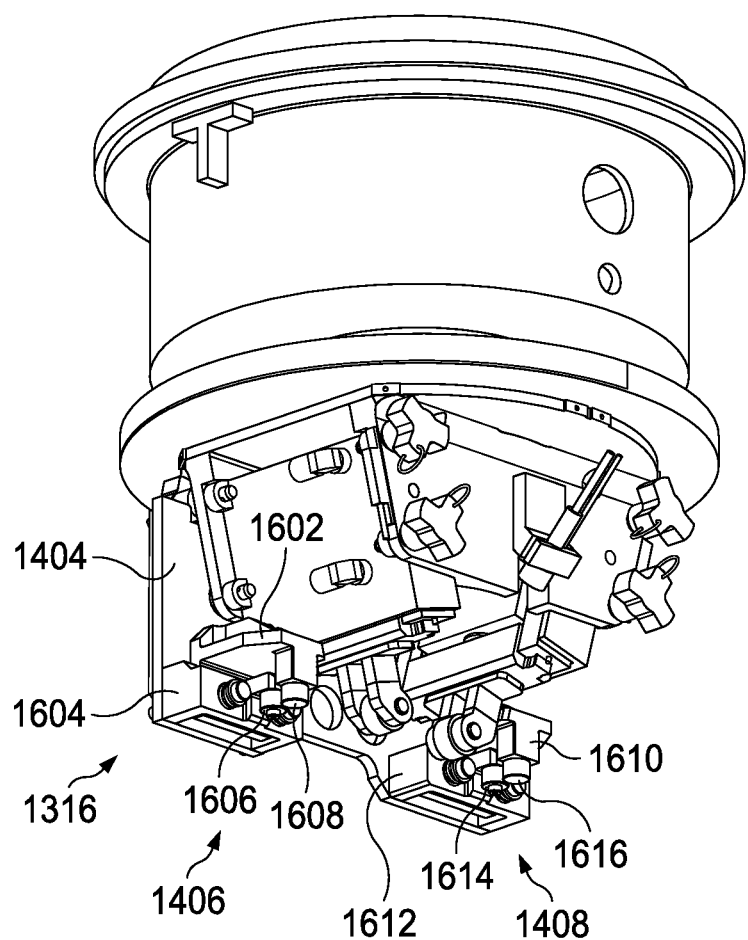
FIG. 16 is a view of an enlarged illustration of the area designated as "FIG. 16" from direction 16 in FIG. 14 in accordance with an illustrative embodiment.

Turning now to FIG. 16, a view of an enlarged illustration of the area designated as "FIG. 16" from direction 16 in FIG. 14 is depicted in accordance with an illustrative embodiment. As depicted, structural positioning system 1316 comprises attachment plate 1404, roller assembly 1406, and roller assembly 1408. Roller assembly 1406 comprises tension roller bracket 1602, locator roller bracket 1604, locator roller 1606, and tension roller 1608. As depicted, tension roller bracket 1602 and locator roller bracket 1604 are moveably connected by a number of fasteners. Specifically, locator roller bracket 1604 and tension roller bracket 1602 are joined by fastener 1524 and fastener 1526. Tension roller bracket 1602 is joined to attachment plate 1404 by fastener 1522. The number of fasteners associated with tension roller bracket 1602 is associated with a number of springs biasing tension roller 1608 towards locator roller 1606. As a result of this biasing, materials inserted between locator roller 1606 and tension roller 1608 are held under a small amount of pressure. Although this illustrative example depicts springs biasing tension roller 1608, any suitable biasing means may be used.

Figure 17:
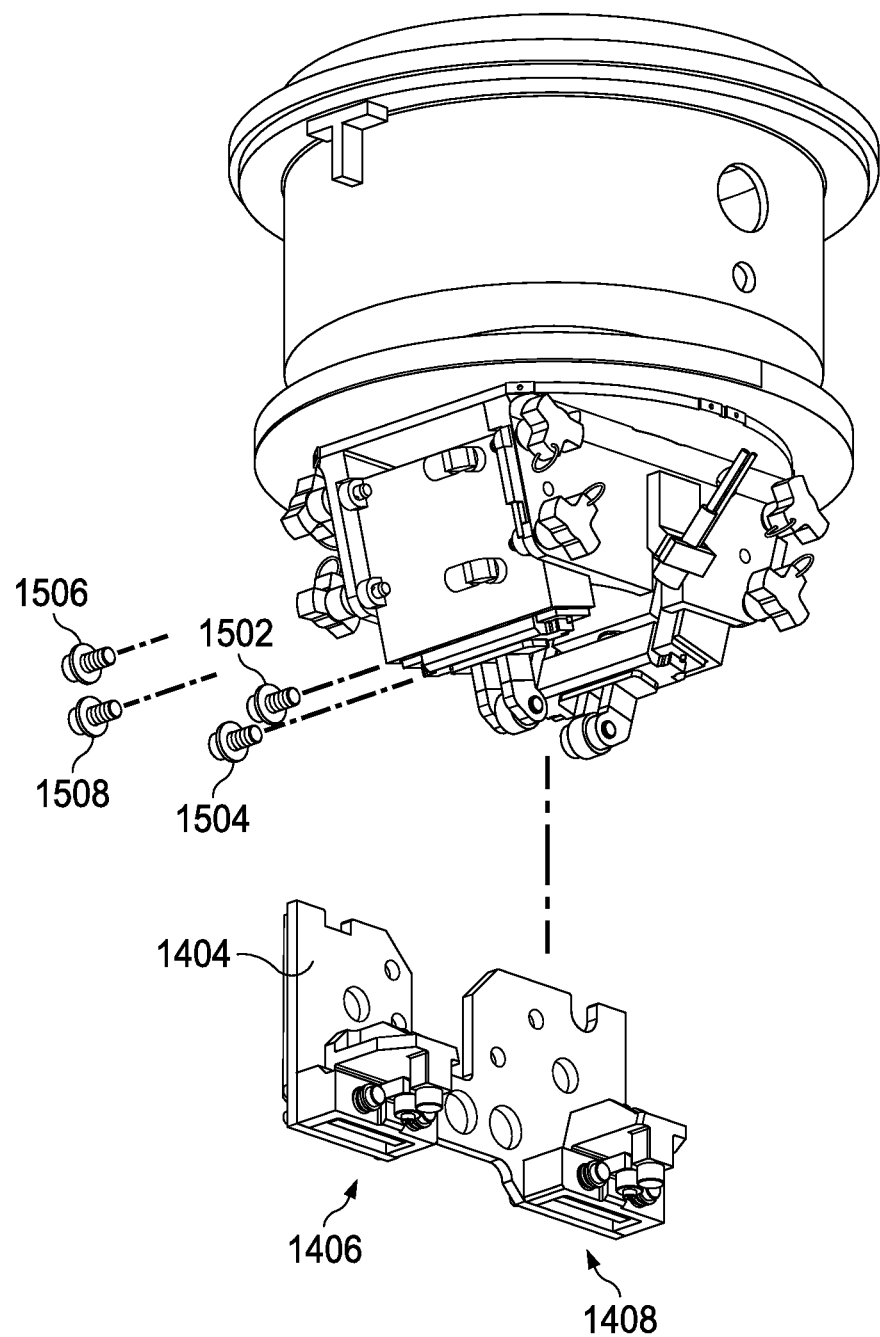
FIG. 17 is an exploded illustration of the apparatus in FIG. 16 in accordance with an illustrative embodiment.

Turning now to FIG. 17, an exploded illustration of the apparatus in FIG. 16 is depicted in accordance with an illustrative embodiment. As depicted, fastener 1502, fastener 1504, fastener 1506, and fastener 1508 may be used to attach structural positioning system 1316 to mounting plate 1314. Specifically, fastener 1502, fastener 1504, fastener 1506, and fastener 1508 may be used to attach attachment plate 1404 to flange 1402.

Figure 18:
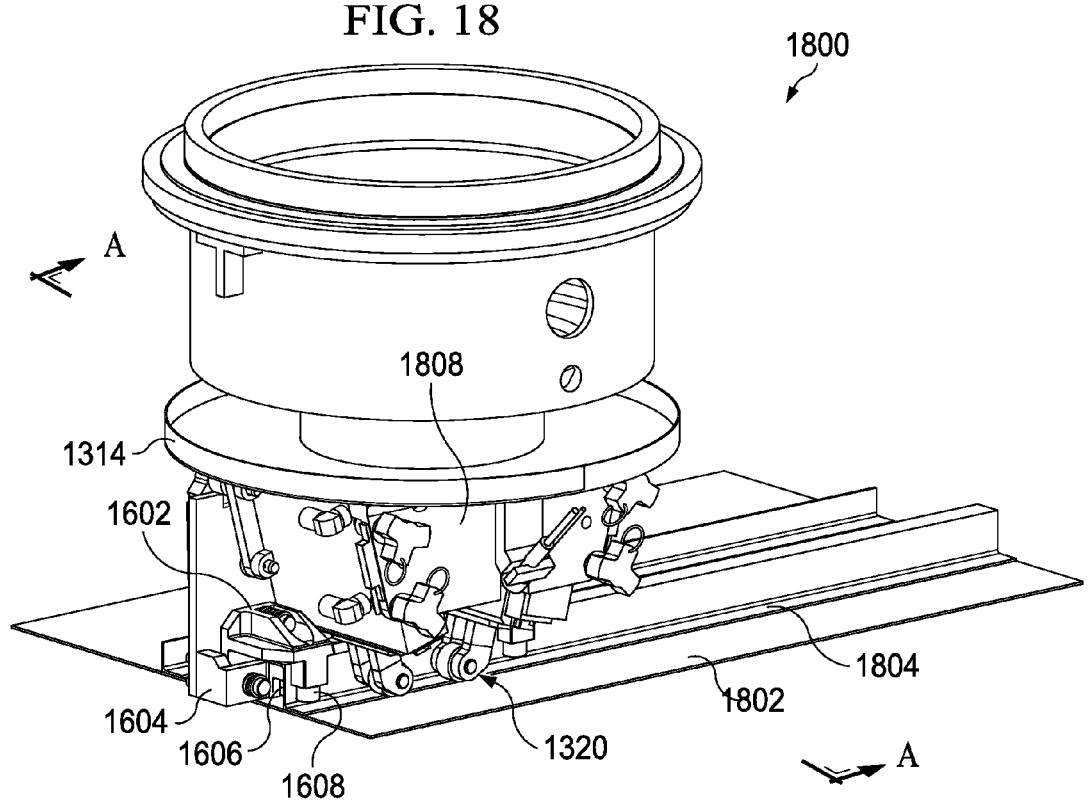
FIG. 18 is an illustration of a friction-stir welding apparatus on a workpiece in accordance with an illustrative embodiment.

Turning now to FIG. 18, an illustration of a friction stir welding apparatus on a workpiece is depicted in accordance with an illustrative embodiment. As depicted, the workpiece comprises structure skin 1802 and stringer 1804. As depicted, a portion stringer 1804 may pass through tension roller 1608 and locator roller 1606 as friction stir welding apparatus 1300 passes over the workpiece. Friction stir welding apparatus 1300 may be driven based on locator roller 1606 contacting stringer 1804.

Friction stir welding apparatus 1300 also has clamping assembly 1320. Clamping assembly 1320 is releasably mounted on mounting plate 1314. Specifically, clamping assembly 1320 is mounted to flange 1402 and flange 1808. As clamping assembly 1320 is releasably mounted on mounting plate 1314, clamping assembly 1320 is releasably mounted on tool support 1301 for movement along an axis independent of the movement of the tool. As depicted, the clamping assembly comprises two clamp devices, specifically two roller clamp packs, for applying clamping pressure to the workpiece.

Figure 19:
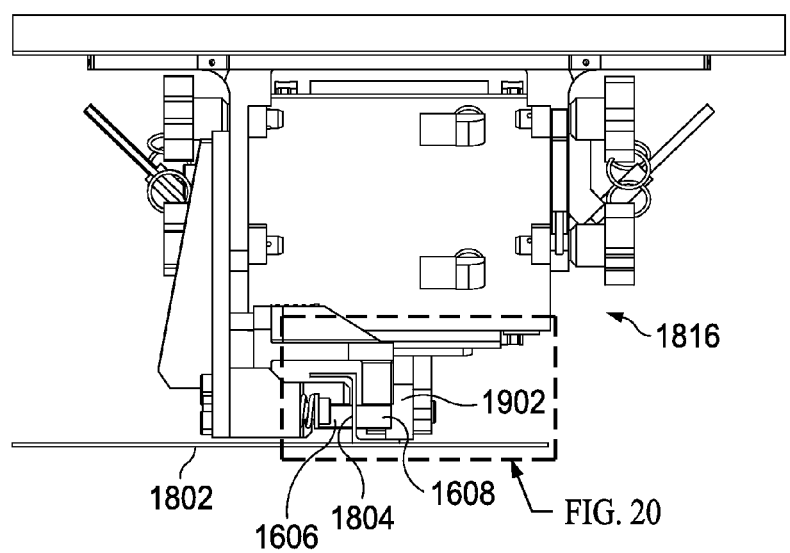
FIG. 19 is an illustration of the friction-stir welding apparatus of FIG. 18 along direction A in accordance with an illustrative embodiment.

Turning now to FIG. 19, an illustration of the friction stir welding apparatus of FIG. 18 along direction A is depicted in accordance with an illustrative embodiment. As depicted, a portion of stringer 1804 may pass through tension roller 1608 and locator roller 1606 as friction stir welding apparatus 1300 passes over the workpiece. In this illustrative example, stringer 1804 is a L-shaped stringer. As a portion of the stringer passes through tension roller 1608 and locator roller 1606, clamping roller 1902 rolls over a bottom portion of stringer 1804. Accordingly, a tool pin of friction stir welding apparatus 1300 passes over this bottom portion of stringer 1804 as well. Thus, tension roller 1608 and locator roller 1606 may be used to position a tool pin of friction stir welding apparatus 1300 relative to a workpiece.

Figure 20:
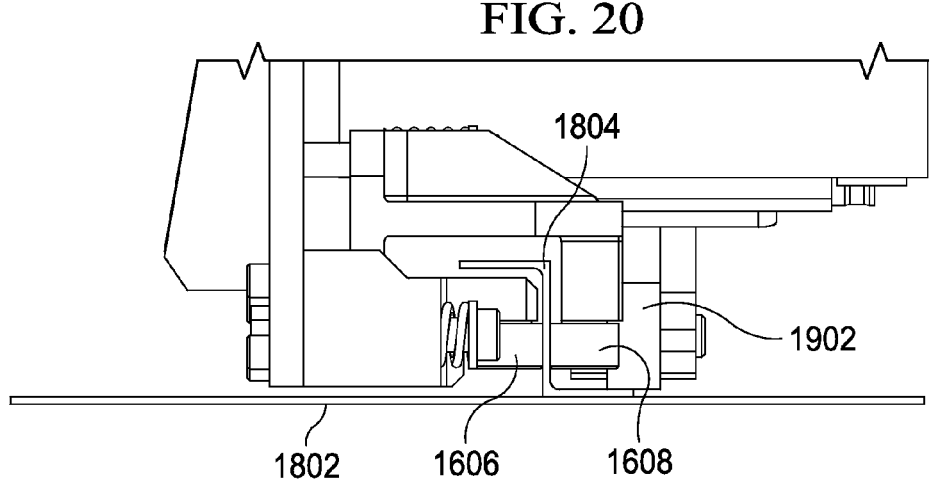
FIG. 20 is an enlarged illustration of the area designated as "FIG. 20" in FIG. 19 in accordance with an illustrative embodiment.

Turning now to FIG. 20, an enlarged illustration of the area designated as "FIG. 20" in FIG. 19 is depicted in accordance with an illustrative embodiment. As depicted, a portion of stringer 1804 may pass through tension roller 1608 and locator roller 1606 as friction stir welding apparatus 1300 passes over the workpiece. As can be more clearly seen in FIG. 20, a portion of the stringer passes through tension roller 1608 and locator roller 1606, clamping roller 1902 rolls over a bottom portion of stringer 1804.

Figure 21:
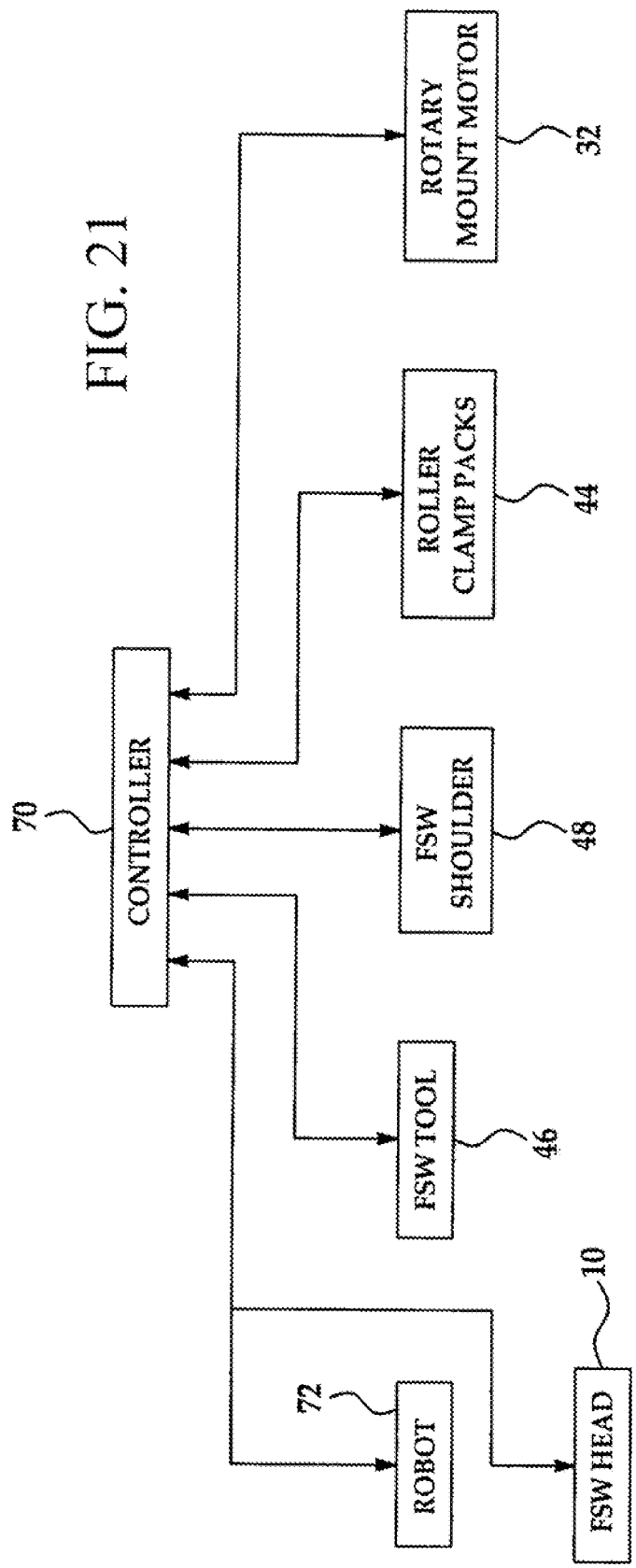
FIG. 21 is a broad block diagram illustrating a system for performing manufacturing operations on a workpiece in accordance with an illustrative embodiment.

Referring now also to FIG. 21, the operations performed on the workpiece 13 by the FSW head 10, including workpiece clamping, may be operated by a controller 70 which may comprise, without limitation, a programmed computer or PLC (programmable logic controller). Controller 70 may control a machine tool 72 that moves the FSW head 10. Controller 70 may also control the operation of the FSW tools 46, 48 which performs the FSW welding operation on the workpiece 13.

The controller 70 may further control a source of pressurized air, (not shown) as well as pneumatic logic (not shown). The pneumatic logic controls the roller clamp packs 48, by controlling the pressure of the air supplied to the cylinders in the roller clamp packs 44. The controlled air pressure regulates the amount of clamping pressure applied to the workpiece 13 by the clamping rollers 56. The controller 70 may send control signals to the motor 32, which may in turn control the rotational position of housing 30a, and thus the rotational position of the clamping rollers 56 on the workpiece 13. Controller 70 may coordinate the movement of the machine tool 72, the operation of the FSW tool 46 and shoulder tool 48, the rotational position of the clamping rollers 56 and the pressure applied to the workpiece 13 by the roller clamp packs 44.

Figure 22:
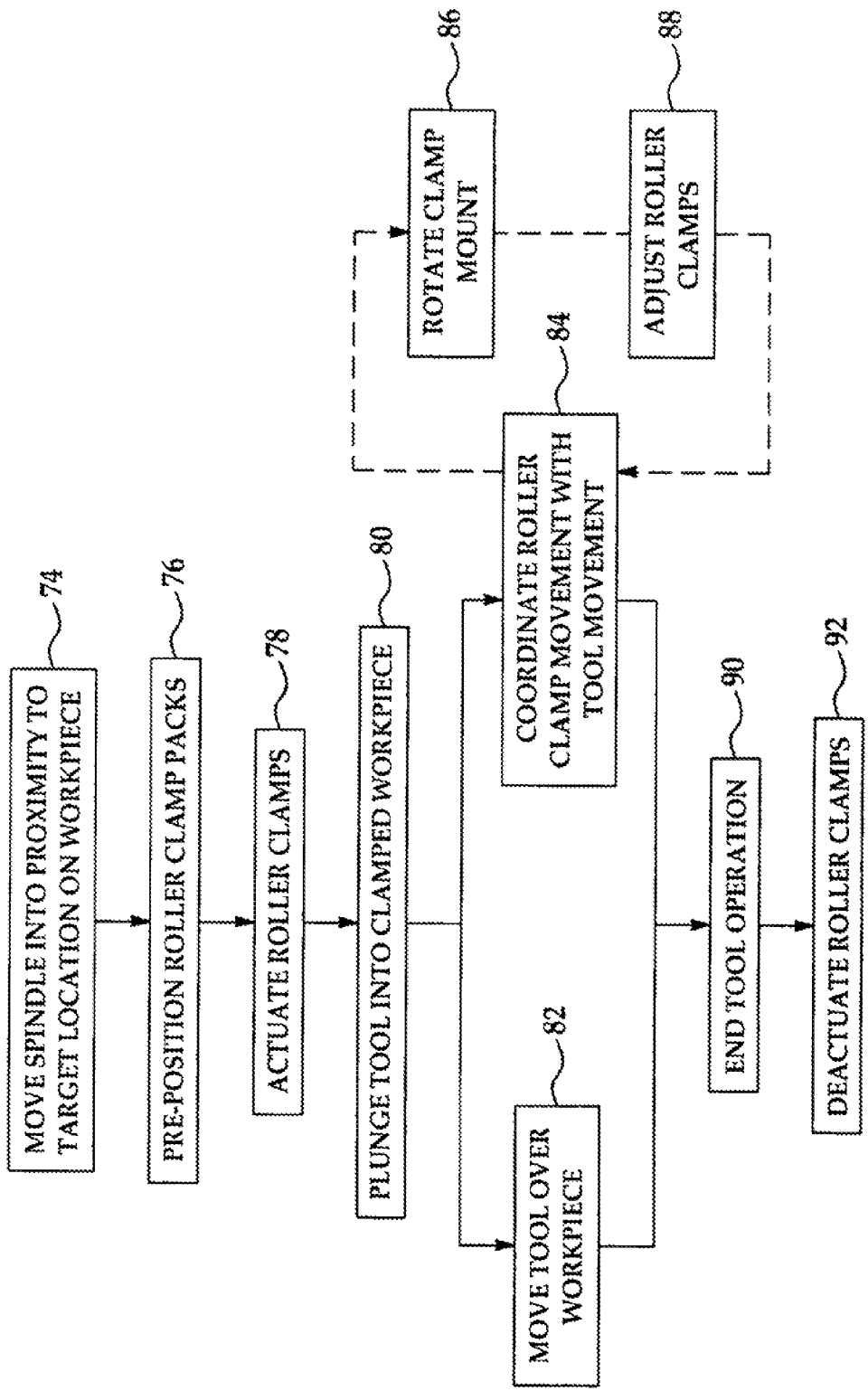
FIG. 22 is a block diagram illustrating a method for performing operations on a workpiece in accordance with an illustrative embodiment.

Attention is now also directed to FIG. 22 which illustrates the basic steps of a method for performing manufacturing operations on a workpiece 13. Beginning at step 74, controller 70 issues control signals that result in movement of the spindle housing 12 into proximity to a target location on a workpiece 13. Next, at step 76, the controller 70 controls motor 32 to rotate the roller clamp packs 44 into position, following which the roller clamp packs 44 are actuated at 78, causing clamping rollers 56 to apply clamping force to the workpiece 13.

With the workpiece 13 having been clamped, the FSW tool 46 is plunged into the workpiece 13 as shown at step 80. The FSW head 10 moves the tool 46 over the workpiece 13 as shown at step 82. As the tool 46 is being moved through a pre-programmed path, the controller 70 coordinates movement of the roller clamp packs 44 around the independent axis 60 with movement of the tool 46, as shown at step 84. In order to coordinate these movements, motor 32 is controlled to rotate the rotatable portion 30 of the clamping assembly 26, so that the clamping rollers 56 properly track movement of tool 46 and the contours of the workpiece 13. If required, the air pressure applied to the roller clamp packs 44 is adjusted at step 88 so that the desired level of clamping force is maintained regardless of the position of the tool 46 on the workpiece 13. When the FSW operation is ended at step 90, the roller clamp packs 44 may be deactuated at step 92, thereby unclamping the workpiece 13.

Figure 23:
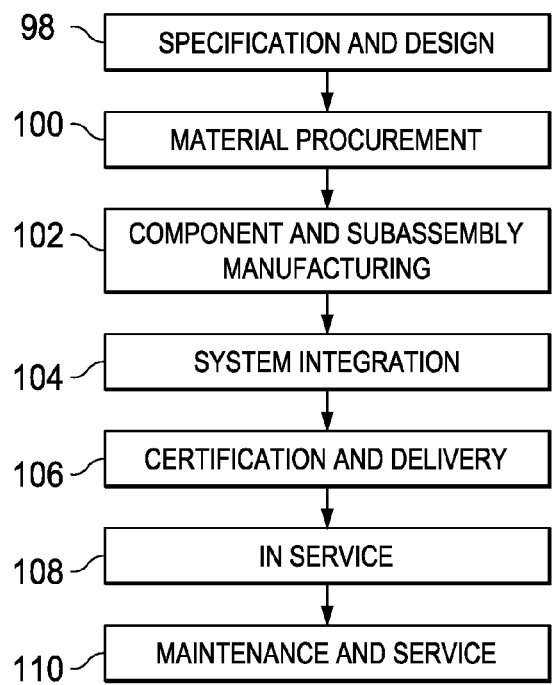
FIG. 23 is a flow diagram of aircraft production and service methodology in accordance with an illustrative embodiment.
Figure 24:
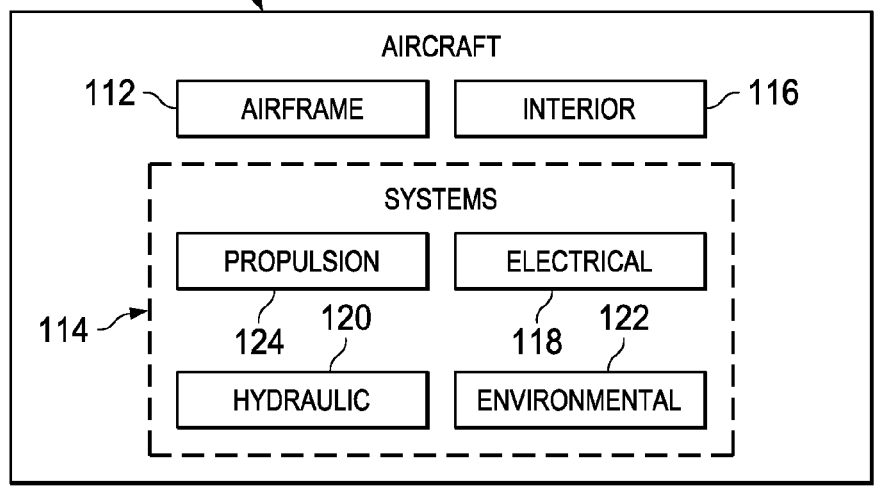
FIG. 24 is a block diagram of an aircraft in which an illustrative embodiment may be implemented.

Referring now to FIGS. 23 and 24, embodiments of the disclosure may be used in the context of an aircraft manufacturing and service method 94 as shown in FIG. 23 and an aircraft 96 as shown in FIG. 24. During pre-production, exemplary method 94 may include specification and design 98 of the aircraft 96 and material procurement 100. During production, component and subassembly manufacturing 102 and system integration 104 of the aircraft 96 takes place. Thereafter, the aircraft 96 may go through certification and delivery 106 in order to be placed in service 108. While in service by a customer, the aircraft 96 is scheduled for routine maintenance and service 110 (which may also include modification, reconfiguration, refurbishment, and so on).

Each of the processes of method 94 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 24, the aircraft 96 produced by exemplary method 94 may include an airframe 112 with a plurality of systems 114 and an interior 116. Examples of high-level systems 114 include one or more of a propulsion system 124, an electrical system 118, a hydraulic system 120, and an environmental system 122. Any number of other systems may be included. Although an aerospace example is shown, the principles of the invention may be applied to other industries, such as the automotive industry.

Apparatus and methods embodied herein may be employed during any one or more of the stages of the production and service method 94. For example, components or subassemblies corresponding to production process 102 may be fabricated or manufactured in a manner similar to components or subassemblies produced while the aircraft 96 is in service. Also, one or more apparatus embodiments, method embodiments, or a combination thereof may be utilized during the production stages 102 and 104, for example, by substantially expediting assembly of or reducing the cost of an aircraft 96. Similarly, one or more of apparatus embodiments, method embodiments, or a combination thereof may be utilized while the aircraft 96 is in service, for example and without limitation, to maintenance and service 110.

A method of performing manufacturing operations on a workpiece is presented. The method comprising the steps of contacting the workpiece with a tool; moving the tool along any of multiple axes; moving a clamp along a first axis independent of the movement of the tool; and clamping the workpiece using the clamp. In one illustrative example, the step of contacting the workpiece with the tool includes plunging a friction stir welding tool into the workpiece after the workpiece is clamped. In another illustrative example, the step of moving the tool along any of multiple axes includes moving a spindle support over the workpiece; and the step of moving the clamp along the first axis independent of the movement of the tool includes rotating the clamp around the first axis as the spindle support moves over the workpiece. In a further illustrative example, the step of clamping the workpiece using the clamp includes engaging the workpiece with at least one roller; moving the roller over the surface of the workpiece; and applying a clamping force to the workpiece through the roller as the roller moves over the workpiece. In another illustrative example, the method further comprises coordinating the movement of the clamp in the step of moving the clamp along the first axis independent of the movement of the tool with the movement of the tool in the step of moving the tool along any of the multiple axes.

A method for performing operations on a workpiece. The method comprises the steps of: contacting the workpiece with a tool; moving the tool along any of multiple axes; moving a clamp along at least a first axis independent of the movement of the tool; and, clamping the workpiece using the clamp. Contacting the workpiece with the tool may comprise plunging a friction stir welding pin tool into the workpiece while the workpiece is being clamped. The tool may be moved by moving a spindle housing over the workpiece, and the clamp may be moved by rotating the clamp around the first axis as the spindle housing moves over the workpiece. The method may further comprise the step of coordinating the movement of the clamp with the movement of the tool.

A manufacturing apparatus is presented. The manufacturing apparatus comprises a tool support movable along multiple axes; a tool mounted on the tool support for performing a manufacturing operation on a workpiece; and a clamping assembly mounted on the tool support for movement along at least a first axis independent of the movement of the tool, the clamping assembly including at least one clamping device for applying clamping pressure to the workpiece. In one illustrative example, the clamping assembly includes a rotary drive on the tool support for rotating the at least one clamping device around the first axis. In one illustrative example, the clamping assembly includes a rotary drive on the tool support for rotating the at least one clamping device around the first axis, the rotary drive including a rotary mount including a first portion fixed to the tool support and a second portion rotatably coupled with the first portion, and a motor for rotating the second portion relative to the first portion. In one illustrative example, the at least one clamping device includes a roller clamp for engaging the workpiece, and means for biasing the roller clamp against the workpiece. In one illustrative example, the at least one clamping device includes a roller clamp for engaging the workpiece, and means for biasing the roller clamp against the workpiece, wherein the biasing means includes a fluid driven motor. In one illustrative example, the at least one clamping device includes a roller clamp for engaging the workpiece, and means for biasing the roller clamp against the workpiece, wherein the at least one clamping device includes a slide, and wherein the roller clamp is mounted on the slide for sliding movement along a second axis toward and away from the workpiece. In one illustrative example, the clamping assembly includes a mounting on the tool support, and the at least one clamping device includes a clamping pack and means for releasably coupling the clamping pack to the mounting. In one illustrative example, the clamping assembly includes a mounting on the tool support, and the at least one clamping device includes a clamping pack and means for releasably coupling the clamping pack to the mounting, wherein the clamping pack includes a slide assembly, and a friction reducing clamping member mounted on the slide assembly for engaging the workpiece.

An apparatus for performing operations on a workpiece is presented. The apparatus comprises a tool assembly including a tool movable along multiple axes; and, a clamping assembly mounted on the tool assembly, the clamping assembly including at least one clamping device for applying clamping pressure to the workpiece, and means for mounting the at least one clamping device for movement along at least a first axis independent of the movement of the tool. In one illustrative example, the tool assembly includes a spindle housing, and the mounting means includes a rotary mount for mounting the at least one clamping device on the spindle housing for rotation around the first axis. In one illustrative example, the tool assembly includes a spindle housing, and the mounting means includes a rotary mount for mounting the at least one clamping device on the spindle housing for rotation around the first axis, wherein the mounting means includes a slide assembly coupled with the rotary mount and mounting the clamping device for movement along a second axis. In one illustrative example, the tool assembly includes a spindle housing, and the mounting means includes a rotary mount for mounting the at least one clamping device on the spindle housing for rotation around the first axis, wherein the rotary mount includes a stationary portion secured to the spindle housing, a rotatable portion coupled between the stationary portion and the clamping device, and a motorized drive for driving the second portion to rotate relative to the first portion. In one illustrative example, the tool assembly includes a spindle housing, and the mounting means includes a rotary mount for mounting the at least one clamping device on the spindle housing for rotation around the first axis, wherein the rotary mount includes a stationary portion secured to the spindle housing, a rotatable portion coupled between the stationary portion and the clamping device, and a motorized drive for driving the second portion to rotate relative to the first portion, wherein the motorized drive includes an electric motor, and a gear drive coupling the motor with the rotatable portion. In one illustrative example, the at least one clamping device includes a roller clamp for engaging the workpiece, and means for biasing the roller clamp against the workpiece. In one illustrative example, the at least one clamping device includes a roller clamp for engaging the workpiece, and means for biasing the roller clamp against the workpiece, wherein the biasing means includes a pneumatic motor. In one illustrative example, the at least one clamping device includes a roller clamp for engaging the workpiece, and means for biasing the roller clamp against the workpiece, wherein the mounting means includes a slide, and wherein the roller clamp is mounted on the slide for sliding movement along a second axis toward and away from the workpiece. In one illustrative example, the at least one clamping device includes a clamping pack, and a releasable connection for releasably securing the clamping pack on the mounting means. In one illustrative example, the at least one clamping device includes a clamping pack, and a releasable connection for releasably securing the clamping pack on the mounting means wherein the mounting means includes a slide assembly, and the clamping pack includes a friction reducing clamping member mounted on the slide assembly for engaging the workpiece.

A method of performing manufacturing operations on a workpiece is presented. The method comprises contacting the workpiece with a tool; moving the tool along any of multiple axes; moving a clamp along a first axis independent of the movement of the tool; and clamping the workpiece using the clamp. In one illustrative example, contacting the workpiece with the tool includes plunging a friction stir welding tool into the workpiece after the workpiece is clamped. In one illustrative example, the method moving the tool along any of multiple axes includes moving a spindle support over the workpiece, and moving the clamp along the first axis independent of the movement of the tool includes rotating the clamp around the first axis as the spindle support moves over the workpiece. In one illustrative example, clamping the workpiece using the clamp includes engaging the workpiece with at least one roller, moving the roller over the surface of the workpiece, and applying a clamping force to the workpiece through the roller as the roller moves over the workpiece. In one illustrative example, the method further comprises coordinating the movement of the clamp with the movement of the tool.

Although the embodiments of this disclosure have been described with respect to certain exemplary embodiments, it is to be understood that the specific embodiments are for purposes of illustration and not limitation, as other variations will occur to those of skill in the art.

What is claimed is:

1. A manufacturing apparatus comprising:
a tool support movable along multiple axes;
a tool mounted on the tool support for performing a manufacturing operation on a workpiece; and
a friction stir spot welding device used in conjunction with the tool, the friction stir spot welding device movable along at least a first axis independent of the movement of the tool, and the friction stir spot welding device comprising:
a base;
a number of fastening braces attached to the base, the fastening braces configured to releasably mount the friction stir spot welding device to the tool support via fasteners;
a material capture ring attached to the base and concentric with the tool when the fastening braces are connected to the tool support; and
a number of pistons attached to the base.

2. The manufacturing apparatus of claim 1, wherein the friction stir spot welding device is releasably mounted on a flange of the tool support.

3. The manufacturing apparatus of claim 2, wherein the tool support comprises a drive configured to rotate the friction stir spot welding device around the first axis.

4. The manufacturing apparatus of claim 2 further comprising:
a clamping assembly releasably mounted on the tool support for movement along the at least first axis independent of the movement of the tool, the clamping assembly comprising at least one clamping device for applying clamping pressure to the workpiece.

5. The manufacturing apparatus of claim 4, wherein the friction stir spot welding device further comprises a number of pneumatic ports configured to supply pneumatic power for clamping during friction stir spot welding.

6. The manufacturing apparatus of claim 4, wherein the at least one clamping device comprises a roller clamp for engaging the workpiece and means for biasing the roller clamp against the workpiece.

7. The manufacturing apparatus of claim 1, wherein the friction stir spot welding device further comprises:
an angular contact bearing configured to provide a number of axis locations for the friction stir spot welding device.

8. The manufacturing apparatus of claim 1, wherein the friction stir spot welding device further comprises a stop attached to the base, the stop configured to aid alignment in attaching the friction stir spot welding device to the tool support.

9. The manufacturing apparatus of claim 1, wherein the friction stir spot welding device further comprises a number of o-rings, each o-ring positioned between one of the number of pistons and the base.

10. A manufacturing apparatus comprising:
a tool support movable along multiple axes, the tool support comprising a number of flanges;
a tool mounted on the tool support for performing a manufacturing operation on a workpiece; and
a friction stir spot welding device used in conjunction with the tool, the friction stir spot welding device moveable along at least a first axis independent of the movement of the tool, and the friction stir spot welding device comprising:
a base;
a number of fastening braces attached to the base, the fastening braces configured to releasably mount the friction stir spot welding device to the tool support via fasteners;
a material capture ring attached to the base and concentric with the tool when the fastening braces are connected to the tool support; and
a number of pistons attached to the base; and
a clamping assembly releasably mounted on at least one of the number of flanges of the tool support for movement along the at least first axis independent of the movement of the tool, the clamping assembly comprising at least one clamping device for applying clamping pressure to the workpiece, the at least one clamping device comprising a roller clamp for engaging the workpiece and means for biasing the roller clamp against the workpiece.

11. The manufacturing apparatus of claim 10, wherein the friction stir spot welding device further comprises:
an angular contact bearing configured to provide a number of axis locations for the friction stir spot welding device.

12. The manufacturing apparatus of claim 10, wherein the friction stir spot welding device further comprises a stop attached to the base, configured to aid alignment in attaching the friction stir spot welding device to the tool support.

13. The manufacturing apparatus of claim 10, wherein the friction stir spot welding device further comprises a number of o-rings, each o-ring positioned between one of the number of pistons and the base.

14. The manufacturing apparatus of claim 10, wherein the friction stir spot welding device further comprises a number of pneumatic ports configured to supply pneumatic power for clamping during friction stir spot welding.

15. A manufacturing apparatus comprising:
a tool support movable along multiple axes;
a tool mounted on the tool support for performing a manufacturing operation on a workpiece;

a structural positioning system releasably mounted on the tool support and used in conjunction with the tool, the structural positioning system moveable along at least a first axis independent of the movement of the tool; and a clamping assembly releasably mounted on the tool support for movement along the at least first axis independent of the movement of the tool, the clamping assembly comprising at least one clamping device for applying clamping pressure to the workpiece.

16. The manufacturing apparatus of claim 15, wherein the structural positioning system comprises:

a number of locator rollers; and a number of tension rollers.

17. The manufacturing apparatus of claim 15, wherein the at least one clamping device comprises a roller clamp for engaging the workpiece and means for biasing the roller clamp against the workpiece.

18. The manufacturing apparatus of claim 15, wherein the tool support comprises a number of flanges and the clamping assembly is releasably mounted on at least one of the number of flanges.

\* \* \* \* \*